(12) United States Patent
Kudo

(10) Patent No.: US 10,916,945 B2
(45) Date of Patent: Feb. 9, 2021

(54) DEMAND AND SUPPLY ADJUSTMENT SYSTEM, CONTROL APPARATUS, CONTROL METHOD, AND PROGRAM

(71) Applicant: NEC Corporation, Tokyo (JP)

(72) Inventor: Koji Kudo, Tokyo (JP)

(73) Assignee: NEC Corporation, Tokyo (JP)

( * ) Notice: Subject to any disclaimer, the term of this patent is extended or adjusted under 35 U.S.C. 154(b) by 86 days.

(21) Appl. No.: 16/098,211

(22) PCT Filed: Nov. 24, 2016

(86) PCT No.: PCT/JP2016/084799
§ 371 (c)(1),
(2) Date: Nov. 1, 2018

(87) PCT Pub. No.: WO2017/195391
PCT Pub. Date: Nov. 16, 2017

(65) Prior Publication Data
US 2019/0123561 A1 Apr. 25, 2019

(30) Foreign Application Priority Data

May 10, 2016 (JP) .................................. 2016-094851

(51) Int. Cl.
*H02J 3/32* (2006.01)
*H02J 13/00* (2006.01)
(Continued)

(52) U.S. Cl.
CPC .............. *H02J 3/32* (2013.01); *G05B 19/042* (2013.01); *H02J 3/38* (2013.01); *H02J 3/382* (2013.01);
(Continued)

(58) Field of Classification Search
CPC .......... H02J 3/32; H02J 13/0006; H02J 3/382; H02J 13/00; H02J 3/38; H02J 3/46;
(Continued)

(56) References Cited

U.S. PATENT DOCUMENTS

| | | | |
|---|---|---|---|
| 2013/0134940 A1* | 5/2013 | Tominaga | B60L 53/67 320/109 |
| 2016/0226249 A1 | 8/2016 | Sakuma et al. | |
| 2016/0311328 A1* | 10/2016 | Kim | B60L 50/64 |

FOREIGN PATENT DOCUMENTS

| | | |
|---|---|---|
| JP | 2012-161202 | 8/2012 |
| JP | 2013-212044 | 10/2013 |

(Continued)

OTHER PUBLICATIONS

Notice of Reasons for Refusal dated May 21, 2019, issued by the Japanese Patent Office in counterpart Japanese Patent Application No. 2018-138802.

(Continued)

*Primary Examiner* — Thomas C Lee
*Assistant Examiner* — Anzuman Sharmin
(74) *Attorney, Agent, or Firm* — Finnegan, Henderson, Farabow, Garrett & Dunner, L.L.P.

(57) ABSTRACT

A control apparatus includes an optimization processing unit which individually calculates a sharing ratio of each of a plurality of energy storage apparatuses to adjusted total power of which demand and supply is adjusted by the energy storage apparatuses on the basis of state information of the corresponding energy storage apparatus, a calculation unit which calculates shared power in at least one energy storage apparatus using demand and supply adjustment information relating to the adjusted total power in the plurality of energy storage apparatuses and the sharing ratio of the at least one energy storage apparatus, and a communication unit which (Continued)

transmits the shared power to the corresponding energy storage apparatus.

21 Claims, 16 Drawing Sheets

(51) Int. Cl.
    *H02J 3/38*     (2006.01)
    *G05B 19/42*     (2006.01)
    *H02J 3/46*     (2006.01)
    *G05B 19/042*     (2006.01)

(52) U.S. Cl.
CPC ................ *H02J 3/46* (2013.01); *H02J 13/00* (2013.01); *H02J 13/0006* (2013.01); *H02J 13/0017* (2013.01); *G05B 2219/2639* (2013.01); *Y02E 40/70* (2013.01); *Y02E 60/00* (2013.01); *Y04S 10/12* (2013.01); *Y04S 10/123* (2013.01); *Y04S 10/14* (2013.01)

(58) Field of Classification Search
CPC .......... G05B 19/042; G05B 2219/2639; Y04S 10/12; Y04S 10/14; Y04S 10/123; Y02E 40/72; Y02E 60/722
See application file for complete search history.

(56) References Cited

FOREIGN PATENT DOCUMENTS

| | | |
|---|---|---|
| JP | 2014-039353 | 2/2014 |
| JP | 2015-202044 | 11/2015 |

OTHER PUBLICATIONS

International Search Report dated Jan. 24, 2017, in corresponding PCT International Application.

* cited by examiner

FIG. 12

| An | Bn | Cn | Dn |
|---|---|---|---|
| SHARING RATIO | RATED POWER OUTPUT | SHARING OUTPUT (MAXIMUM VALUE) | SHARED POWER |
| 0.2 | 1000W | 200W | |
| | 1100W | 220W | |
| | 900W | 180W | |
| | 800W | 160W | |
| 0.1 | 700W | 70W | |
| | 800W | 80W | |
| | 900W | 90W | |
| | 800W | 80W | |
| 0.3 | 800W | 240W | |
| | 900W | 270W | |
| | 1000W | 300W | |
| | 1200W | 360W | |
| ⋮ | ⋮ | ⋮ | ⋮ |
| TOTAL | | | |

|  | PATTERN A | PATTERN B | PATTERN C |
|---|---|---|---|
| DEMAND AND SUPPLY ADJUSTMENT INFORMATION | ADJUSTED TOTAL POWER Wsum | ADJUSTED TOTAL POWER Wsum | STANDARDIZED VALUE LFC |
| SHARING INFORMATION | SHARING RATIO An | SHARING COEFFICIENT Kn | SHARING COEFFICIENT Kn |

FIG. 14A

[PATTERN A]

| S205 | ADJUSTED TOTAL POWER Wsum, STATE INFORMATION Sn → SHARING RATIO An |
|---|---|
| S207, S213 | SHARED POWER Dn = ADJUSTED TOTAL POWER Wsum × SHARING RATIO An |

FIG. 14B

[PATTERN B]

| S205 | SHARING COEFFICIENT Kn = SHARING RATIO An × MAXIMUM ADJUSTED TOTAL POWER Wmax / RATED POWER OUTPUT Bn |
|---|---|
| S207, S213 | SHARED POWER Dn = ADJUSTED TOTAL POWER Wsum / MAXIMUM ADJUSTED TOTAL POWER Wmax × SHARING COEFFICIENT Kn × RATED POWER OUTPUT Bn |

FIG. 14C

[PATTERN C]

| S205 | SHARING COEFFICIENT Kn = SHARING RATIO An × MAXIMUM ADJUSTED TOTAL POWER Wmax / RATED POWER OUTPUT Bn |
|---|---|
| S207, S213 | SHARED POWER Dn = STANDARDIZED VALUE LFC × SHARING COEFFICIENT Kn × RATED POWER OUTPUT Bn |

FIG. 15A

[PATTERN A]

| ID | ADJUSTED TOTAL POWER Wsum | SHARING RATIO An | SHARED POWER Dn |
|---|---|---|---|
| 0001 | 200kW | 0.01 | 2kW |
| 0002 |  | 0.005 | 1kW |
| ⋮ | ⋮ | ⋮ | ⋮ |
| TOTAL | | | 200kW |

FIG. 15B

[PATTERN B]

| ID | ADJUSTED TOTAL POWER Wsum / MAXIMUM ADJUSTED TOTAL POWER Wmax | SHARING COEFFICIENT Kn | RATED POWER OUTPUT Bn | SHARED POWER Dn |
|---|---|---|---|---|
| 0001 | 200kW/300kW | 1 | 3kW | 2kW |
| 0002 |  | 0.5 | 3kW | 1kW |
| ⋮ | ⋮ | ⋮ | ⋮ | ⋮ |
| TOTAL | | | | 200kW |

FIG. 15C

[PATTERN C]

| ID | LFC | SHARING COEFFICIENT Kn | RATED POWER OUTPUT Bn | SHARED POWER Dn |
|---|---|---|---|---|
| 0001 | 0.66 (200kW/300kW) | 1 | 3kW | 2kW |
| 0002 |  | 0.5 | 3kW | 1kW |
| ⋮ | ⋮ | ⋮ | ⋮ | ⋮ |
| TOTAL | | | | 200kW |

# DEMAND AND SUPPLY ADJUSTMENT SYSTEM, CONTROL APPARATUS, CONTROL METHOD, AND PROGRAM

CROSS-REFERENCE TO RELATED PATENT APPLICATIONS

This application is a National Stage Entry of International Application No. PCT/JP2016/084799, filed Nov. 24, 2016, which claims priority from Japanese Patent Application No. 2016-094851, filed May 10, 2016. The entire contents of the above-referenced applications are expressly incorporated herein by reference.

TECHNICAL FIELD

The present invention relates to a demand and supply adjustment system, a control apparatus, a control method, and a program, and particularly to a demand and supply adjustment system, a control apparatus, a control method, and a program which perform a demand and supply adjustment control of a power system.

BACKGROUND ART

Patent Document 1 discloses a power system control system which performs a power demand and supply adjustment using a plurality of secondary batteries.

In the power system control system disclosed in Patent Document 1, a hierarchical demand and supply control apparatus receives information on a secondary battery (for example, charge efficiency and remaining capacity) from each of the plurality of secondary batteries under management (lower layers). The hierarchical demand and supply control apparatus aggregates the information on secondary batteries under management. The hierarchical demand and supply control apparatus transmits aggregated secondary battery information which is aggregated information on secondary batteries to an upper apparatus, and thereafter receives control information relating to the aggregated secondary batteries from the upper apparatus. The hierarchical demand and supply control apparatus generates control information on each secondary battery under management on the basis of the received control information and the information on each secondary battery under management.

The hierarchical demand and supply control apparatus controls a charge and discharge of each secondary battery under management using the control information on each secondary battery under management.

RELATED DOCUMENT

Patent Document

[Patent Document 1] Japanese Patent Application Publication No. 2012-161202

SUMMARY OF THE INVENTION

Technical Problem

The hierarchical demand and supply control apparatus in the power system control system disclosed in Patent Document 1 is required to update the aggregated secondary battery information relating to the secondary batteries managed by different entities such as the secondary batteries owned by a large-scale consumer, a small-scale consumer, or an aggregator under management for every fixed time, and to transmit the aggregated secondary battery information after the update to the upper apparatus.

However, when pieces of information on all the secondary batteries under management cannot be received within the fixed time, it is not possible to generate a new aggregated secondary battery information relating to all the secondary batteries under management. Therefore, a problem that the power demand and supply adjustment for the secondary batteries under management cannot be performed accurately occurs.

The present invention is made in view of the above circumstances, and a purpose thereof is to provide a demand and supply adjustment system, a control apparatus, a control method, and a program capable of optimizing an arithmetic process according to performance of an energy storage apparatus such as a secondary battery.

Solution to Problem

Aspects of the present invention employ the following configurations in order to solve the problem described above.

A first aspect relates to a control apparatus.

The control apparatus according to the first aspect includes an optimization processing unit which individually calculates a sharing ratio of each of a plurality of energy storage apparatuses to adjusted total power of which demand and supply is adjusted by the energy storage apparatuses on the basis of state information of the corresponding energy storage apparatus, a calculation unit which calculates shared power in at least one energy storage apparatus using demand and supply adjustment information relating to the adjusted total power in the plurality of energy storage apparatuses and the sharing ratio of the at least one energy storage apparatus, and a communication unit which transmits the shared power to the corresponding energy storage apparatus.

A second aspect relates to a demand and supply adjustment system.

The demand and supply adjustment system according to the second aspect includes a demand and supply adjustment control apparatus which controls an energy storage apparatus, and a control apparatus connected to the demand and supply adjustment control apparatus through a network. The control apparatus includes an optimization processing unit which individually calculates a sharing ratio of each of a plurality of energy storage apparatuses to adjusted total power of which demand and supply is adjusted by the energy storage apparatuses on the basis of state information of the corresponding energy storage apparatus, a calculation unit which calculates shared power in at least one energy storage apparatus using demand and supply adjustment information relating to the adjusted total power in the plurality of energy storage apparatuses and the sharing ratio of the at least one energy storage apparatus, and a communication unit which transmits the shared power to the corresponding energy storage apparatus.

A third aspect relates to a control method executed by at least one computer.

The control method executed by a control apparatus according to the third aspect includes individually calculating a sharing ratio of each of a plurality of energy storage apparatuses to adjusted total power of which demand and supply is adjusted by the energy storage apparatuses on the basis of state information of the corresponding energy storage apparatus, calculating shared power in at least one energy storage apparatus using demand and supply adjustment information relating to the adjusted total power in the plurality of energy storage apparatuses and the sharing ratio of the at least one energy storage apparatus, and transmitting the shared power to the corresponding energy storage apparatus.

Note that another aspect of the present invention may be a program causing at least one computer to execute the third aspect described above or a computer readable storage medium storing such program. The storage medium includes a non-transitory tangible medium.

When this computer program is executed by the computer, a computer program code which causes the computer to implement the control method on the control apparatus is included.

Note that any combination of the components described above and those obtained by converting an expression of the present invention between the method, the apparatus, the system, the storage medium, the computer program, and the like are also effective as the aspects of the present invention.

Various types of components of the present invention are not always necessary to be present independently but may be such that a plurality of components are formed as one member, one component is formed by a plurality of members, a certain component is a part of another component, a part of a certain component overlaps with a part of another component, or the like.

A plurality of procedures are sequentially described in the method and the computer program of the present invention, but the order of the description does not limit an order which executes the plurality of procedures. Thus, when the method and the computer program of the present invention are implemented, it is possible to change the order of the plurality of procedures within a permissible range in contents.

Furthermore, the plurality of procedures of the method and the computer program of the present invention are not limited to being executed at a different timing individually. Thus, another procedure may occur while a certain procedure is executed, a part or all of an execution timing of another procedure may overlap with an execution timing of a certain procedure, or the like.

Advantageous Effects of Invention

With each aspect described above, it is possible to provide the demand and supply adjustment system, the control apparatus, the control method, and the program capable of optimizing an arithmetic process according to performance of the energy storage apparatus.

BRIEF DESCRIPTION OF THE DRAWINGS

The purpose described above and another purpose, a feature, and an advantage are further clarified by preferred example embodiments described below and the following drawings attached to the example embodiments.

FIG. 12 is a diagram showing an example of demand and supply adjustment information of a plurality of secondary batteries managed by the control apparatus of the present example embodiment.

FIG. 13 is a diagram for describing an arithmetic process of the demand and supply adjustment system of the present example embodiment.

FIG. 14 is a diagram for describing the arithmetic process of the demand and supply adjustment system of the present example embodiment.

FIG. 15 is a diagram for describing the arithmetic process of the demand and supply adjustment system of the present example embodiment.

DESCRIPTION OF EMBODIMENTS

Figure 1:
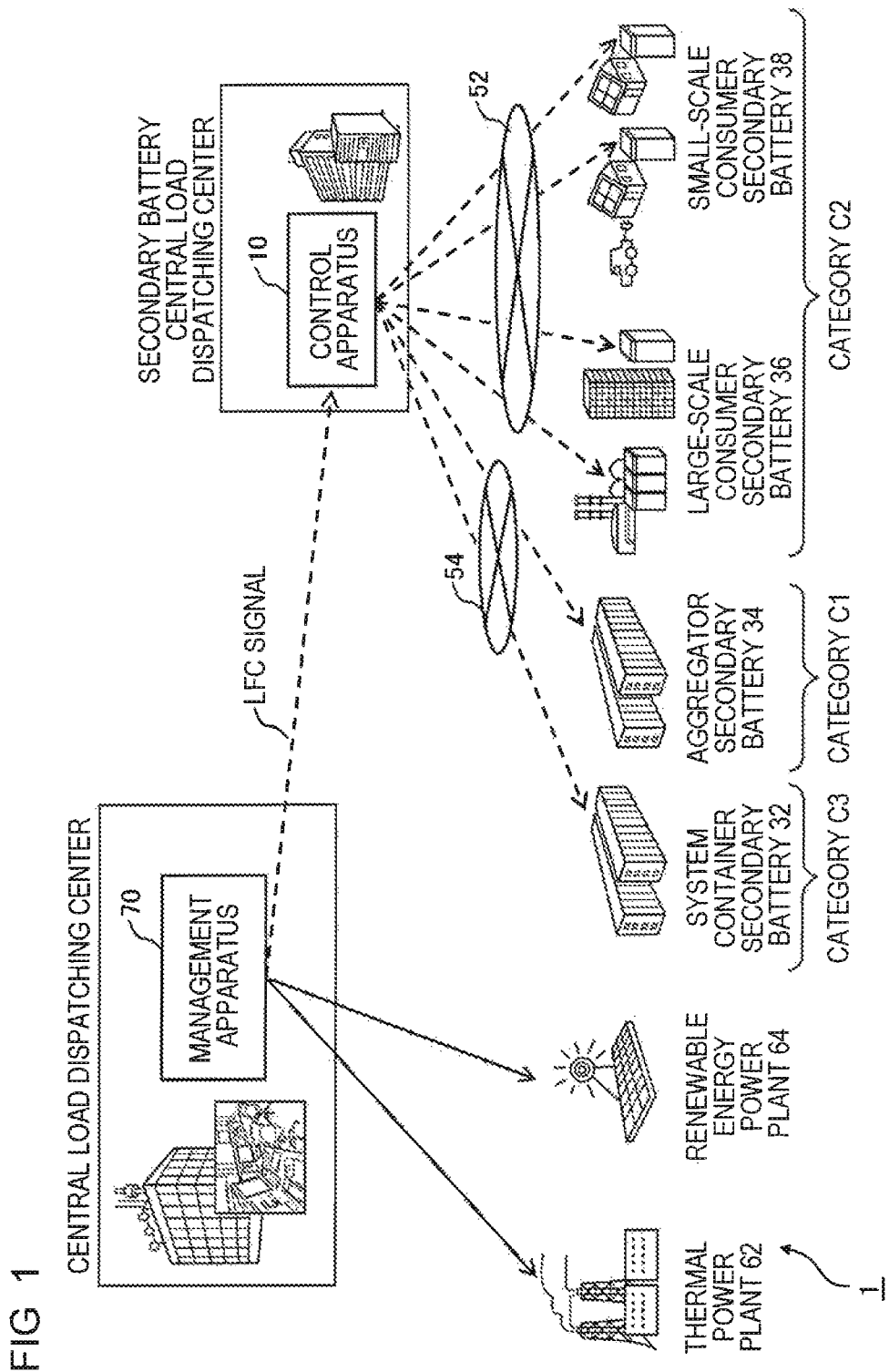
FIG. 1 is a diagram for describing an example of an entire image and an outline of a demand and supply adjustment system according to example embodiments of the present invention.

Hereinafter, example embodiments of the present invention will be described with reference to drawings. Note that the same reference numeral will be assigned to the same component and a description will not be repeated in all the drawings.

First Example Embodiment

A demand and supply adjustment system, a control apparatus, a control method, and a program according to a first example embodiment of the present invention will be described below.

Figure 2:
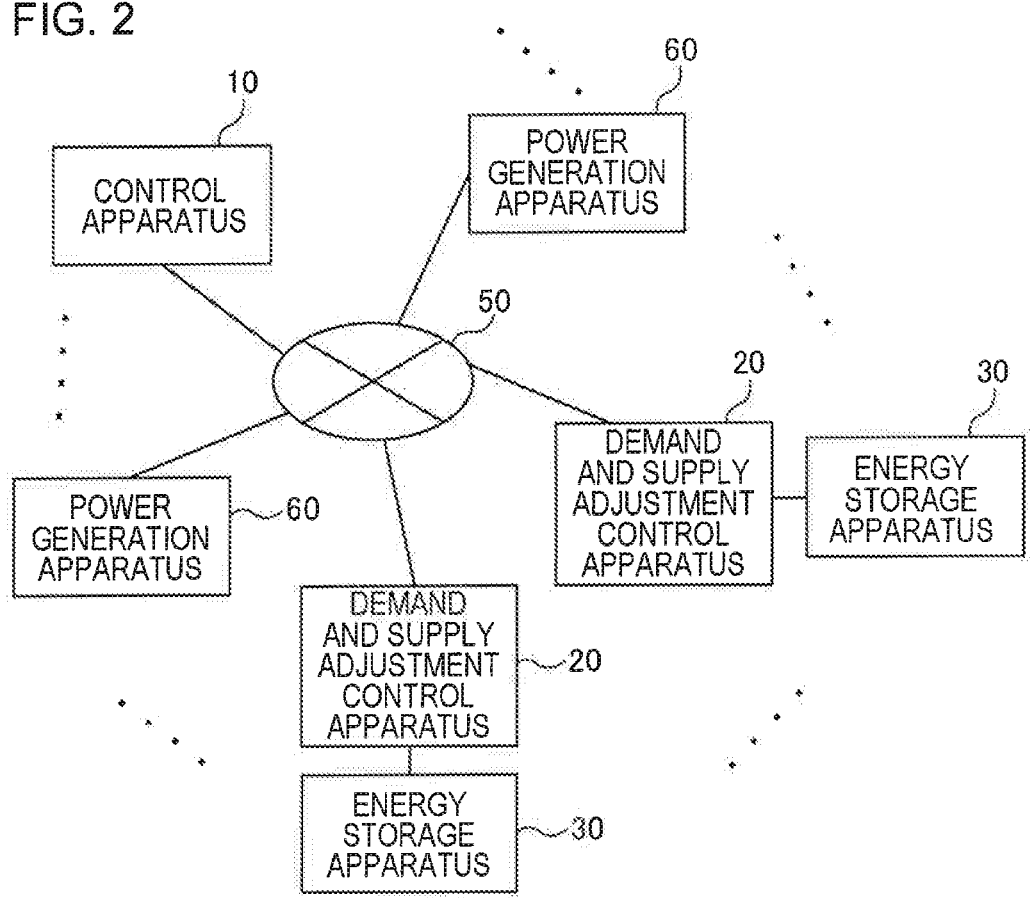
FIG. 2 is a diagram conceptually showing a system configuration of the demand and supply adjustment system according to the example embodiments of the present invention.

FIG. 1 is a diagram for describing an example of an entire image and an outline of a demand and supply adjustment system 1 according to the example embodiments of the present invention. FIG. 2 is a diagram conceptually showing a system configuration of the demand and supply adjustment system 1 according to the example embodiments of the present invention.

In each of the following drawings, a configuration of a portion irrelevant to the essence of the present invention will be omitted and will not be shown in the drawings.

A frequency of a power system (hereinafter, also referred to as "system frequency") fluctuates according to power outputs of power generation facilities (for example, thermal power plant 62 and renewable energy power plant 64 of FIG. 1) and power consumption of a consumer load in the power system. There are also secondary batteries (such as system container secondary battery 32, aggregator secondary battery 34, large-scale consumer secondary battery 36, and small-scale consumer secondary battery 38 of FIG. 1) which charges and discharges the power in addition to the power generation facility (thermal power plant 62) and the load consuming the power in the power system. There are various types of secondary batteries, and various methods of integrally controlling the secondary batteries are studied.

In order to perform a control for maintaining the system frequency of the power system at a reference value, a load frequency control (LFC) signal is transmitted from a management apparatus 70 of a central load dispatching center to a control apparatus 10 of a secondary battery central load dispatching center periodically (for example, every four to five seconds, and hereinafter, referred to as period T1).

The demand and supply adjustment system 1 of the present invention integrally controls charge and discharge of various energy storage apparatuses 30 (for example, secondary batteries) according to the LFC signal to efficiently perform a power demand and supply adjustment.

The demand and supply adjustment system 1 of the present example embodiment has the control apparatus 10 and a plurality of demand and supply adjustment control apparatuses 20. Note that an energy storage system (for example, power storage apparatus) may be configured by the demand and supply adjustment control apparatus 20 and the energy storage apparatus 30 (for example, secondary battery including a power conditioning system (PCS)). The demand and supply adjustment system 1 may have the energy storage system. The demand and supply adjustment system 1 may have a plurality of power generation apparatuses 60. The apparatuses are connected to each other through a network 50 such as the Internet and exchange information with each other.

In the demand and supply adjustment system of the example embodiment of the present invention, for example, an aggregator or an energy service provider integrally controls charge and discharge of a plurality of secondary batteries owned by various entities (for example, large-scale consumer, small-scale consumer, and aggregator itself) in the power system to provide a demand and supply adjustment service of the power.

Examples of the provided demand and supply adjustment service are illustrated below, but the present invention is not limited thereto.

(a1) A power demand and supply adjustment control of the power system is performed. Charge and discharge allocation is optimized for the plurality of secondary batteries having differences in specification, performance, and state in the power system so as to fully utilize performance of each battery.

(a2) Management and allotment of charge and discharge to each secondary battery are performed so as to storing a reserve of the power for unforeseen circumstances.

(a3) The charge and the discharge of each secondary battery are controlled so as to deal with a ramp fluctuation in a power generation amount of a renewable energy power plant or the like.

(a4) The charge and the discharge of each secondary battery are controlled so as to avoid a full charge or exhaustion of the secondary battery.

The control apparatus 10 is an example of the control apparatus of the example embodiment of the present invention and is a cloud server of the aggregator, the provider providing the service, or the like. Details of the control apparatus 10 will be described below.

The power generation apparatus 60 is not particularly limited and is apparatuses of the thermal power plant 62 and the renewable energy power plant 64 which generates the power using natural energy such as sunlight, wind power, small hydraulic power, or geothermal power in FIG. 1. Any configuration can be employed for the power generation apparatus 60. The power generation apparatus 60 may be a large-scale power generation apparatus (for example, mega-solar) managed by a business entity or a small-scale power generation apparatus managed by a general household.

The energy storage apparatus 30 is configured to store the supplied power as predetermined energy. For example, the secondary battery storing the supplied power as the power, an electric vehicle (secondary battery mounted on), or a heat pump water heater which converts the supplied power into thermal energy and stores the converted thermal energy is considerable, but the present invention is not limited thereto. Any configuration can be employed for the energy storage apparatus 30. The energy storage apparatus 30 may be a large-scale energy storage apparatus (for example, system container secondary battery 32 of FIG. 1) managed by a business entity or a small-scale energy storage apparatus (for example, small-scale consumer secondary battery 38 of FIG. 1) managed by a general household.

The demand and supply adjustment control apparatus 20 controls the charge, the discharge, and the consumption of the power by the energy storage apparatus 30. The demand and supply adjustment control apparatus 20 is not shown in FIG. 1. The demand and supply adjustment control apparatus 20 and the energy storage apparatus 30 are separately described in FIG. 2, but these may be configured physically or logically separated or may be configured physically or logically together.

The demand and supply adjustment control apparatus 20 is, for example, an energy management system (EMS), and there are various functions and pieces of performance thereof provided depending on the energy storage apparatus 30 to be controlled. Furthermore, the demand and supply adjustment control apparatus 20 has a function of communicating with the control apparatus 10 through the network 50 and can control the energy storage apparatus 30 according to an instruction from the control apparatus 10. There are also various communication means and supported protocols between the demand and supply adjustment control apparatus 20 and the control apparatus 10 depending on the energy storage apparatus 30.

For example, in a case of the large-scale consumer secondary battery 36 and the small-scale consumer secondary battery 38 of FIG. 1, security is ensured by predetermined authentication and a ciphering process between the control apparatus 10 and a corresponding demand and supply adjustment control apparatus 20, and then the apparatuses are connected using the network 50 such as an Internet 52.

In a case of the system container secondary battery 32 and the aggregator secondary battery 34, the control apparatus 10 and the corresponding demand and supply adjustment control apparatus 20 are connected by a dedicated channel 54 such as a virtual private network (VPN).

Figure 3:
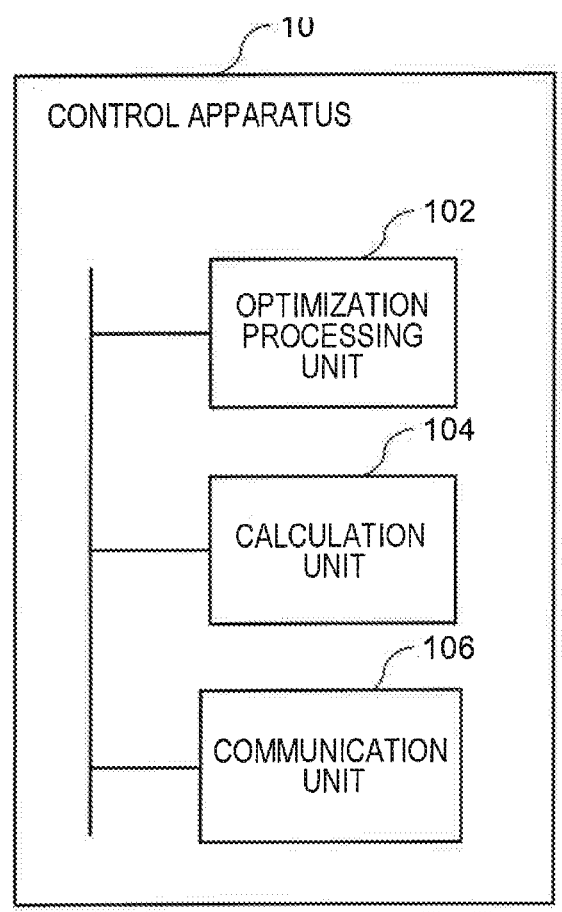
FIG. 3 is a function block diagram logically showing a configuration of a control apparatus according to the example embodiment of the present invention.

FIG. 3 is a function block diagram logically showing a configuration of the control apparatus 10 according to the example embodiment of the present invention.

The control apparatus 10 of the present example embodiment includes an optimization processing unit 102 which individually calculates a sharing ratio An of each energy storage apparatus 30 (hereinafter, n indicates a natural number from one to n. For example, it is assumed that there are n energy storage apparatuses 30 to be targeted.) to adjusted total power Wsum of which demand and supply is adjusted by a plurality of energy storage apparatuses 30 on the basis of state information of the corresponding energy storage apparatus 30, a calculation unit 104 which calculates shared power Dn in at least one energy storage apparatus 30 using demand and supply adjustment information relating to the adjusted total power Wsum in the plurality of energy storage apparatuses 30 and the sharing ratio An of the at least one energy storage apparatus 30, and a communication unit 106 which transmits the shared power Dn to the corresponding energy storage apparatus 30 (demand and supply adjustment control apparatus 20).

In the present example embodiment, the demand and supply adjustment information is, for example, the LFC signal or a reserve power signal (reserve power signal is a signal which requests the energy storage apparatus to discharge in a form of instantaneous reserve power, hot reserve power, or the like in order to compensate for insufficient supply capacity when an abnormality occurs such that a thermal power generator or the like linked to the power system is disconnected from the power system due to a failure or a disaster.). For example, in the example embodiment, it is possible to determine the adjusted total power Wsum which is a total of the power of which the demand and supply is required to be adjusted by the plurality of energy storage apparatuses 30 (secondary battery group managed and controlled by secondary battery central load dispatching center) as a whole on the basis of the demand and supply adjustment information.

In the present example embodiment, the demand and supply adjustment information indicates a value of the adjusted total power Wsum itself.

The demand and supply adjustment information may be indicated by, for example, a value of a ratio of the adjusted total power Wsum to a total (hereinafter, also referred to as "maximum adjusted total power Wmax") of power outputs (for example, rated power output Bn) in which the respective energy storage apparatuses may provide in order to perform the demand and supply adjustment in the entire secondary battery group (adjusted total power Wsum/maximum adjusted total power Wmax)×100(%), or a standardized value (hereinafter, also referred to as "standardized value LFC". Value of −1 to 1) indicating (adjusted total power Wsum/maximum adjusted total power Wmax) in addition to the adjusted total power Wsum itself described above. The present invention is not limited to the modes illustrated here. A transmission mode of the LFC signal may include a mode of representing the standardized value as a pulse signal of UP/Down with value zero as a reference (for example, UP indicates plus 1 and Down indicates minus 1, and a previous pulse value may be continued until the pulse value is changed, or a numerical value may be indicated by a pulse width or the number of pulses).

For example, in a case where the adjusted total power Wsum is 200 kW, the power is charged at 200 kW in the entire secondary battery group. In a case where the adjusted total power Wsum is −100 kW, the power is discharged at 100 kW in the entire secondary battery group.

The maximum adjusted total power Wmax is not only integration (total) of rated value of secondary batteries but also a total amount of values that respective batteries allow providing as a maximum value, as adjustment power and reserve power. For example, in a case where a consumer determines to provide only 2 kW for the adjustment power even with a battery rated at 3 kW and sets an upper limit output (<rated power output), the integration of any smaller value of the upper limit output provided by respective secondary batteries for the adjustment power and the rated power output is the maximum adjusted total power Wmax.

The control apparatus 10 calculates the maximum adjusted total power Wmax of the entire energy storage apparatus 30 group to be controlled and managed of the secondary battery central load dispatching center on the basis of attribute information 112 (FIG. 5A) and state information 113 (FIG. 5B) of each energy storage apparatus 30. In the present example embodiment, furthermore, in consideration of a possibility (probability) that a predetermined state may occur in the secondary battery group, an upper limit output (for example, αn) provided by the secondary battery for the adjustment power is multiplied by a predetermined sharing coefficient βn (sharing coefficient βn is smaller than one) and is integrated, and the maximum adjusted total power Wmax is calculated using the following equation (1) and transmitted to the management apparatus 70.

$$\text{The maximum adjusted total power } W\text{max} = \Sigma(\beta n \times \alpha n) \quad \text{equation (1)}$$

The predetermined state is, for example, a state of charge (SOC) state, a temperature, or an occurrence state of a failure or an operation abnormality of the secondary battery.

In a case where there is a secondary battery which cannot be used for the adjustment power due to a communication environment between each secondary battery and the control apparatus 10 or the abnormality, the failure, or the like of each secondary battery, the value of the maximum adjusted total power Wmax changes. The control apparatus 10 may update the value of the maximum adjusted total power Wmax periodically or at any time and may transmit the updated value to the management apparatus 70.

In the optimization processing unit 102, on the assumption of the SOC state, the temperature, and the possibility of the failure or the operation abnormality of each battery, an initial value of βn is set with sufficient failure margin such that the value of the maximum adjusted total power Wmax becomes a value smaller than a value of Σαn. In a case where the optimization processing unit 102 changes βn according to a state of a certain secondary battery as the control apparatus 10 performs a demand and supply adjustment control, combinations of weights of charge and discharge sharing (sharing coefficient βn) of other secondary batteries are optimized to adjust such that a constant value is maintained as the value of Σ(βn×αn). Thus, the maximum adjusted total power Wmax guaranteed by the entire secondary battery group seems to be constant with high reliability from a viewpoint of the management apparatus 70.

As described above, the LFC signal may be provided with the standardized value LFC as a ratio (for example, 200/300=0.66) of the adjusted total power Wsum (for example, 200 kW) to the maximum adjusted total power Wmax (for example, 300 kW) of the entire secondary battery group managed by the secondary battery central load dispatching center. For example, the LFC signal is a value having a range of −1 to 1. In a case where the LFC signal is 1, the charge is performed at 300 kW in the entire secondary battery group, and in a case where the LFC signal is −1, the discharge is performed at 300 kW in the entire secondary battery group.

As described above, the demand and supply adjustment information such as the LFC signal or the like is periodically (for example, every four to five seconds) transmitted from the management apparatus 70 of the central load dispatching center to the control apparatus 10.

The LFC signal may be transmitted together with, for example, timestamp information when the signal is output. The demand and supply adjustment control apparatus 20 which controls the energy storage apparatus 30 using the timestamp information may perform the control in synchronization with another demand and supply adjustment control apparatus 20.

On the other hand, since each secondary battery cannot provide all of the rated power output Bn for the demand and supply adjustment, the upper limit output αn thereof which can be provided for the demand and supply adjustment is transmitted to the control apparatus 10. There may be a need to further adjust the power output depending on a state, for example, SOC or temperature of each secondary battery. For example, there is a case where it is better so as not to perform the charge for a secondary battery with a free capacity less than a threshold value, a secondary battery with temperature equal to or higher than a threshold value, or the like. In consideration of such state of each secondary battery, the control apparatus 10 performs the optimization on the basis of the state information 113 of each secondary battery and determines the charge and discharge allocation of each secondary battery as the sharing ratio An. The optimization will be described below.

In the present example embodiment, the sharing ratio An indicates a ratio of the shared power Dn which is required to be charged and discharged by the corresponding energy storage apparatus 30 (secondary battery) to the adjusted total power Wsum of which the demand and the supply are required to be adjusted by the control apparatus 10. As described below, a sharing coefficient Kn in consideration of the rated power output Bn (including upper limit output αn and power output that can be provided) of the energy storage apparatus 30 may be used. Hereinafter, the sharing ratio An and the sharing coefficient Kn are also referred to as sharing information. A relationship between the sharing coefficient βn described above and the sharing information will be described below.

In the control apparatus 10 of the present example embodiment, first, the optimization processing unit 102 determines the sharing ratio An of the power which is required to be charged and discharged by each secondary battery on the basis of the demand and supply adjustment information. Next, the calculation unit 104 obtains the shared power Dn which is required to be charged and discharged by each secondary battery using the sharing ratio An.

The demand and supply adjustment information and the sharing information used when the shared power Dn is calculated are illustrated below, but the present invention is not limited thereto. Here, three patterns A, B, and C will be described.

As shown in FIG. 13, the demand and supply adjustment information and the sharing information are different for each pattern. In pattern A, the adjusted total power Wsum is used as the demand and supply adjustment information, and the sharing ratio An (here, An=(βn×αn)/Wmax) which is a share of the shared power Dn of each secondary battery to the maximum adjusted total power Wmax is set as the sharing information. In pattern B, the adjusted total power Wsum is used as the demand and supply adjustment information, and the sharing coefficient Kn (here, Kn=βn) is obtained as the sharing information in consideration of the rated power output Bn (including upper limit output αn and power output that can be provided) of each secondary battery. In pattern C, the standardized value LFC is used as the demand and supply adjustment information, and the sharing coefficient Kn (here, Kn=βn) is obtained as the sharing information in consideration of the rated power output Bn (including upper limit output αn and power output that can be provided) of each secondary battery.

As described above, the value of the maximum adjusted total power Wmax can be changed. In pattern B, the changed maximum adjusted total power Wmax may be transmitted from the control apparatus 10 to the respective energy storage apparatuses 30. In pattern C, the control apparatus 10 transmits the changed maximum adjusted total power Wmax to the management apparatus 70, and the maximum adjusted total power Wmax received from the control apparatus 10 is used for calculating the standardized value LFC in the management apparatus 70. The calculated standardized value LFC may be transmitted from the management apparatus 70 to the control apparatus 10.

Figure 11:
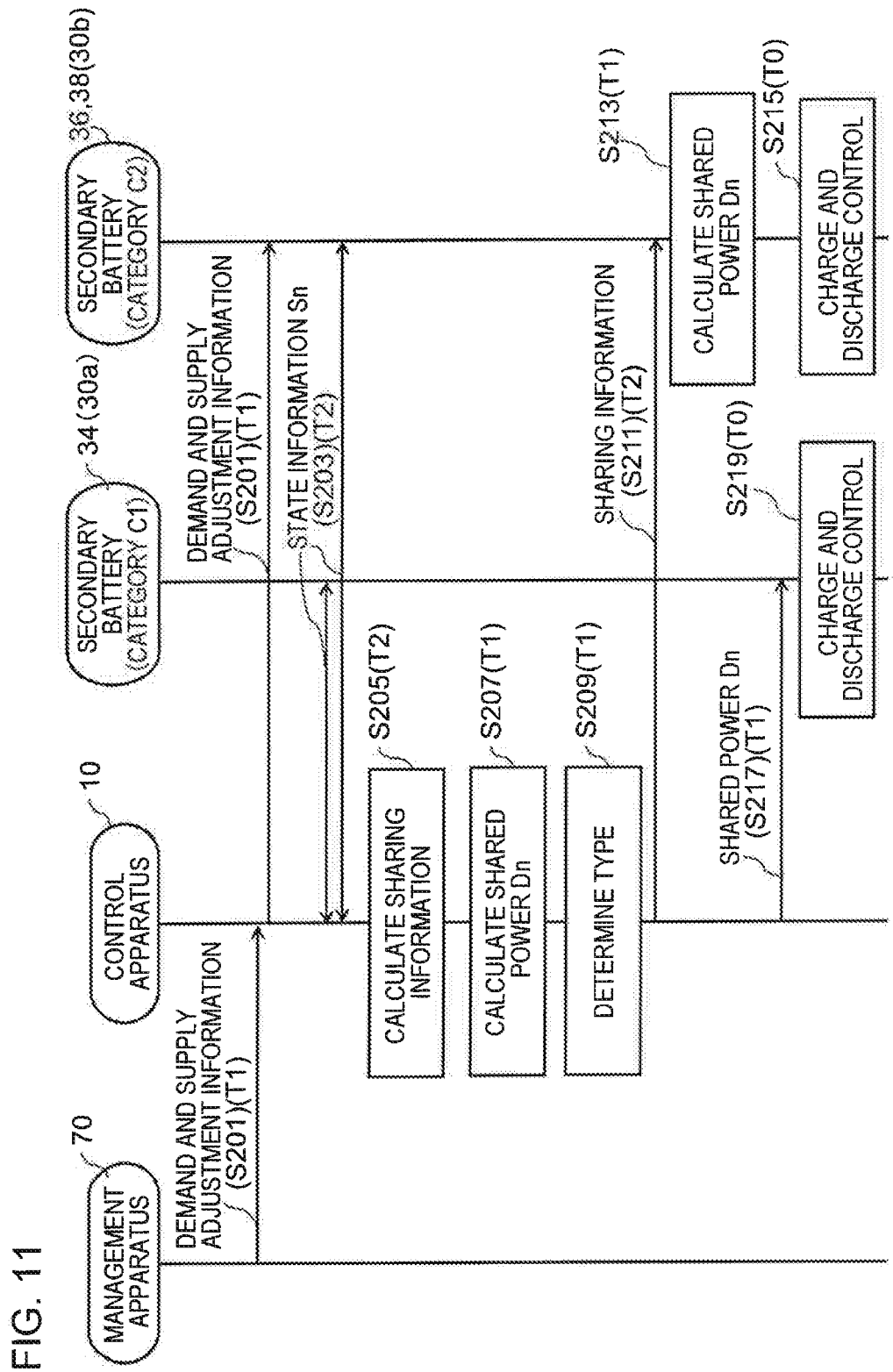
FIG. 11 is a sequence diagram showing an example of a process flow of each apparatus of the demand and supply adjustment system of the present example embodiment.

FIG. 14 lists and indicates the sharing information calculated in step S205 of a flowchart (FIG. 11) showing an operation procedure of the demand and supply adjustment system 1 of the present example embodiment described below, and information or an arithmetic equation used for calculating the shared power calculated in step S207 or step S213 of the flowchart (FIG. 11). Note that details of the flowchart of FIG. 11 will be described below.

(Pattern A)

As shown in FIG. 14A, in pattern A, the adjusted total power Wsum is used as the demand and supply adjustment information, and the sharing ratio An of the shared power Dn of each secondary battery to the maximum adjusted total power Wmax is obtained on the basis of state information Sn of the energy storage apparatus 30 and is set as the sharing information (step S205).

The shared power Dn of each secondary battery is obtained by adjusted total power Wsum×sharing ratio An (steps S207 and S213). At the time, it is confirmed that the shared power Dn of each secondary battery does not exceed the upper limit output αn of the secondary battery. In a case of exceeding the upper limit output, the optimization process such as the adjustment of the sharing ratio An is performed again.

(Pattern B)

As shown in FIG. 14B, in pattern B, the sharing coefficient Kn of each secondary battery is indicated by the ratio of the maximum adjusted total power Wmax to the rated power output Bn (chargeable and dischargeable power including upper limit output αn and power output that can be provided) of each secondary battery and is set as the sharing information. Specifically, the sharing coefficient Kn may be calculated using the following equation (2) (step S205).

Sharing coefficient $Kn$=sharing ratio $An$×maximum adjusted total power $Wmax$/rated power output $Bn$     equation (2)

The shared power Dn of each secondary battery may be calculated using the following equation (3) (step S207, step S213).

Shared power $Dn$=adjusted total power $Wsum$/maximum adjusted total power $Wmax$×sharing coefficient $Kn$×rated power output $Bn$     equation (3)

(Pattern C)

As shown in FIG. 14C, the sharing coefficient Kn of each secondary battery is indicated by the ratio of the maximum adjusted total power Wmax to the rated power output Bn (including upper limit output αn and power output that can be provided) of each secondary battery and is set as the sharing information. Specifically, the sharing coefficient Kn may be calculated using the following equation (2) (step S205).

The shared power Dn of each secondary battery may be calculated using the following equation (4) (step S207, step S213).

$$\text{Shared power } Dn = \text{standardized value LFC} \times \text{sharing coefficient } Kn \times \text{rated power output } Bn \quad \text{equation (4)}$$

<Optimization Process for Secondary Battery Group>

The demand and supply adjustment system 1 of the present example embodiment cannot only adjust demand and supply balance of the power of the power system but also ensure a reserve charge and discharge capacity of the secondary battery for dealing with unforeseen circumstances or deal with the ramp fluctuation of the power output of the power generation apparatus 60 by controlling the charge, the discharge, and the consumption of the power by each energy storage apparatus 30.

Hereinafter, the optimization process in consideration of an attribute and a state of the secondary battery (energy storage apparatus 30) in the control apparatus 10 of the present example embodiment will be described.

Figure 4:
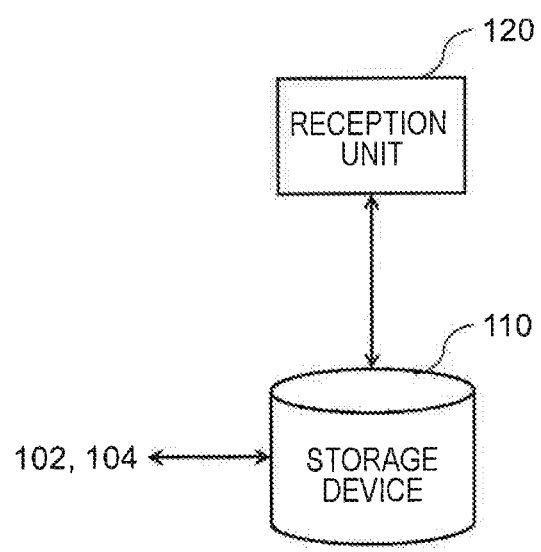
FIG. 4 is a function block diagram logically showing a configuration of a part of the control apparatus of the present example embodiment.

FIG. 4 is a function block diagram logically showing a configuration of a part of the control apparatus 10 of the present example embodiment.

A reception unit 120 which periodically acquires the state information of each energy storage apparatus 30 and a storage device 110 which stores the received state information 113 are further included.

The reception unit 120 periodically acquires the state information 113 indicating the state of the energy storage apparatus 30 from each energy storage apparatus 30 through the network 50. The acquired state information 113 is stored in the storage device 110.

FIG. 5 shows an example of data structures of the storage device 110 accessible by the control apparatus 10 of the present example embodiment.

Figure 5A:
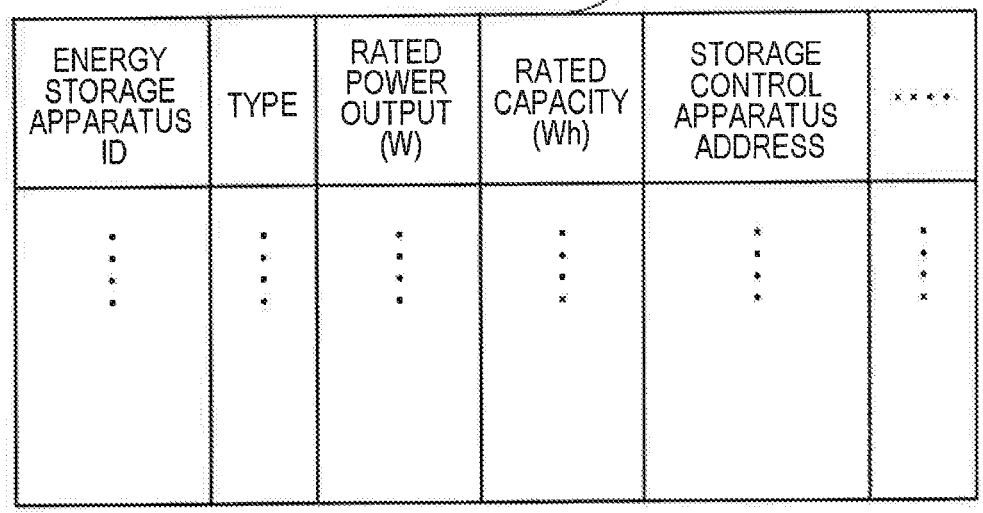
FIG. 5 is a diagram showing an example of data structures of attribute information and state information of an energy storage apparatus of a storage device accessible by the control apparatus of the present example embodiment.
Figure 5B:
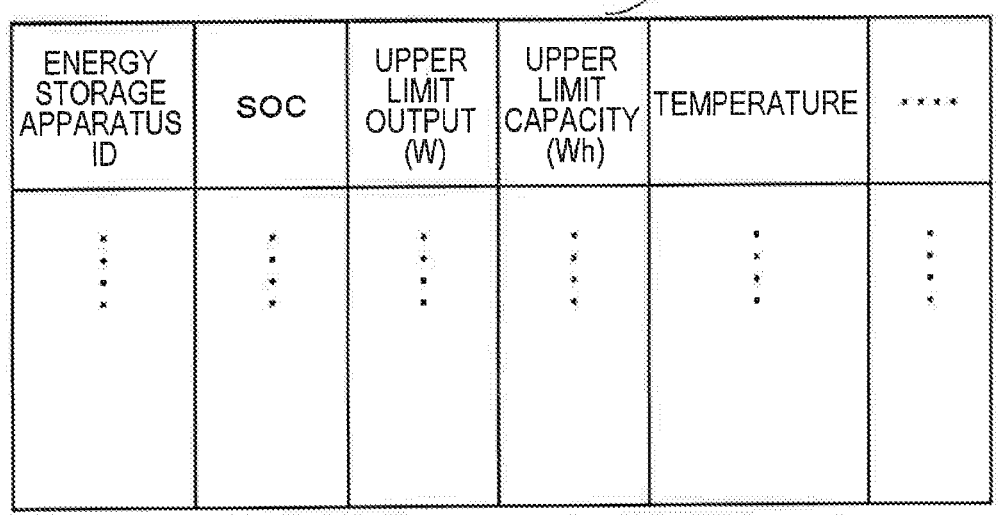

As shown in FIG. 5B, the state information 113 which is acquired from the energy storage apparatus 30 by the reception unit 120 is a value indicating, for example, the full charge or exhaustion state, the state of charge (SOC), or the upper limit output of the PCS which can be allocated for the demand and supply adjustment, which are those of the secondary battery. Specifically, SOC, free capacity (Wh), charged capacity (Wh), upper limit output (W), upper limit capacity (Wh), a power output (W) that can be provided for demand and supply adjustment, electric voltage, electric current, temperature, amount of energy storage, and error information are included. Note that some of these may not be included as the state information 113 or another piece of state information 113 may be further acquired and stored.

The reception unit 120 receives the state information of the energy storage apparatus 30 used for calculating the sharing ratio An at an interval longer than an interval at which the optimization processing unit 102 transmits the shared power Dn or the demand and supply adjustment information.

The state of the energy storage apparatus 30 is changed at a lower speed as compared with a fluctuation speed of the adjusted total power Wsum of which the demand and the supply are required to be adjusted. Thus, a timing of acquiring the state information 113 from each energy storage apparatus 30 by the reception unit 120 may be set as, for example, a period T2 in units of several minutes (five minutes in the present example embodiment) which is longer than the period T1.

In the present specification, "acquisition" includes at least any one of acquiring data or information stored in another apparatus or a storage medium by an apparatus itself (active acquisition), for example, receiving by requesting or inquiring to another apparatus or reading by accessing another apparatus or the storage medium, and inputting data or information output from another apparatus to an apparatus itself (passive acquisition), for example, receiving data or information distributed (or transmitted, push notified, or the like). Acquiring by selecting from among pieces of received data or information or receiving by selecting data or information distributed is also included.

Furthermore, the reception unit 120 receives the demand and supply adjustment information (for example, LFC signal, and the transmission mode of the LFC signal may include the pulse signal of +1 or −1 as described above and may be any mode) including at least any one of the adjusted total power Wsum and the standardized value LFC from the management apparatus 70.

As described above, the standardized value LFC is calculated on the basis of the adjusted total power Wsum and the maximum adjusted total power Wmax in the management apparatus 70, and transmitted to the control apparatus 10. However, the standardized value LFC may be calculated on the basis of the adjusted total power Wsum received from the management apparatus 70 and the maximum adjusted total power Wmax in the control apparatus 10. In the case of pattern B, the standardized value LFC calculated in the control apparatus 10 may be transmitted to the energy storage apparatus 30 without transmitting the maximum adjusted total power Wmax to the energy storage apparatus 30.

Pieces of attribute information 112 of the plurality of energy storage apparatuses 30 to be managed by the control apparatus 10 are registered in the storage device 110.

For example, in the attribute information 112 of each energy storage apparatus 30 as shown in FIG. 5A, an energy storage apparatus ID which identifies each of the plurality of energy storage apparatuses 30, a type of each energy storage apparatus 30, a rated power output Bn (W) of each energy storage apparatus 30, a rated capacity (Wh) of each energy storage apparatus 30, a power output (W) that can be provided for the demand and supply adjustment, and address information of the demand and supply adjustment control apparatus 20 which controls each energy storage apparatus 30 on the network 50 are associated with one another. Note that some of these may not be included as the attribute information 112 or another piece of attribute information 112 may be further registered.

The type in FIG. 5A indicates, for example, a classification depending on an energy storing means such as the secondary battery or the heat pump water heater, a battery type such as a lead secondary battery or a lithium-ion secondary battery, or further a charge and discharge response characteristic of the secondary battery. Note that in a case where the energy storage apparatuses 30 registered as the management target are limited to one type (example: only lithium-ion secondary battery), the registration of this attribute information is unnecessary.

The optimization processing unit 102 calculates the sharing ratio An on the basis of the state of the energy storage apparatus 30 with reference to the state information 113 (FIG. 5B) of the storage device 110 so that the charge amount is optimized for preventing the full charge or the exhaustion of the secondary battery of the energy storage apparatus 30.

Various calculation methods of the sharing ratio An can be considered (for example, may be calculated according to the SOC of the secondary battery as disclosed in Japanese Patent Publication No. 5811302 of the inventors of the present invention).

In addition to the above method, the attribute information 112 (FIG. 5A) may be referred to or the attribute information 112 of each energy storage apparatus 30 may be acquired in advance.

The optimization processing unit 102 updates the sharing ratio An (sharing information) for each energy storage apparatus 30 on the basis of the state information 113 at an interval longer than an interval at which the communication unit 106 transmits the shared power Dn or the demand and supply adjustment information.

In the present invention, allocation of the power of which the demand and the supply is adjusted may be determined depending on the type of the energy storage apparatus 30 and may be further used as weighting for the sharing ratio An. For example, in the secondary batteries such as the large-scale consumer secondary battery 36 and the small-scale consumer secondary battery 38, their charging or discharging capacity are uncertain. Therefore, there is a possibility that a required power output in an emergency or the like cannot be obtained or that there is no free capacity. On the other hand, in the secondary battery such as the aggregator secondary battery 34, a charge and discharge control of the secondary battery is performed by the demand and supply adjustment control apparatus 20 so as to maintain a certain level.

An allotment ratio may be calculated assuming that the allocation of the shared power of the aggregator secondary battery 34 is increased and the allocation of the shared power of the large-scale consumer secondary battery 36 and the small-scale consumer secondary battery 38 is regarded as to be about 80 when an available power output and capacity calculated from the upper limit output (W) of respective secondary batteries is 100. That is, the allotment ratio is calculated using a value obtained by multiplying the upper limit output and the upper limit capacity of the secondary battery of the small-scale consumer secondary battery 38 registered in advance in the attribute information 112 by 0.8.

Figure 6:
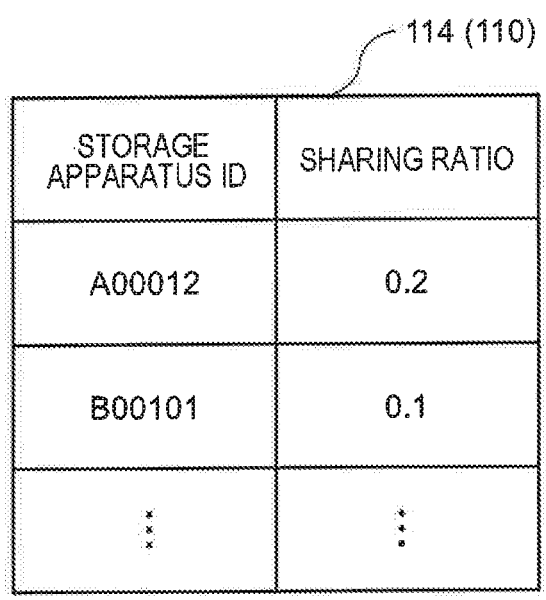
FIG. 6 is a diagram showing an example of data structure of sharing ratio information of the storage device accessible by the control apparatus of the present example embodiment.

The optimization processing unit 102 individually calculates the sharing ratio An of each of the energy storage apparatuses 30 to the adjusted total power Wsum of which the demand and the supply are required to be adjusted by the plurality of energy storage apparatuses 30 on the basis of the state information 113 of the energy storage apparatus 30. The sharing ratio An calculated in this manner may be stored in the storage device 110 for each energy storage apparatus 30 as in sharing ratio information 114 of FIG. 6.

As described above, since the state information of each energy storage apparatus 30 is updated at the period T2, it is preferable that a processing timing of the optimization processing unit 102 is also executed in synchronization with the period T2. A calculation process of the optimization processing unit 102 is repeatedly executed at a timing after at least the state information of the energy storage apparatus 30 is updated.

The calculation unit 104 calculates the shared power Dn in at least one energy storage apparatus 30 using the demand and supply adjustment information and the sharing ratio An of the at least one energy storage apparatus 30.

As described above, the demand and supply adjustment information is information relating to the adjusted total power Wsum, for example, the LFC signal. In the present example embodiment, the demand and supply adjustment information is distributed from the management apparatus 70 to the control apparatus 10 as the LFC signal (in the example, standardized value LFC of −1 to 1). The calculation unit 104 uses the LFC signal received from the management apparatus 70 by the reception unit 120 for calculating the shared power Dn. It is preferable that a timing of the calculation process of the calculation unit 104 is executed in synchronization with the period T1. A calculation process of the calculation unit 104 is repeatedly executed at a timing after at least the LFC signal is received from the management apparatus 70. At the time, since the sharing ratio An of each energy storage apparatus 30 is updated every period T2, the calculation process is performed at the period T1 using the same sharing ratio An until the sharing ratio An is updated.

In this manner, in the present example embodiment, the optimization processing unit 102 updates the sharing ratio An of each energy storage apparatus 30 at the period T2 (about five minutes) on the basis of the state information 113 (SOC, temperature, upper limit output, and the like) of the energy storage apparatus 30.

When the demand and supply adjustment information, such as the LFC signal or the like is received at the period T1, the calculation unit 104 calculates the shared power Dn (W or Wh) in each energy storage apparatus 30 on the basis of the demand and supply adjustment information, the sharing ratio An, and the rated power output Bn (including upper limit output and power output that can be provided) of each energy storage apparatus 30 for each period T1.

Note that since update frequency (period T2) of the sharing ratio An is lower than update frequency (period T1) of the demand and supply adjustment information, the process of calculating the shared power Dn is performed at the period T1 in the calculation unit 104 on the basis of the sharing ratio An, the demand and supply adjustment information, and the rated power output Bn of each energy storage apparatus 30 using the same sharing ratio An until the sharing ratio An is updated at the period T2.

The communication unit 106 transmits the shared power Dn which is a calculation result to the corresponding energy storage apparatus 30 through the network 50. The communication unit 106 may acquire the address of each energy storage apparatus 30 with reference to type information 212 to execute the transmission. It is preferable that a timing of a transmission process by the communication unit 106 is executed in synchronization with the period T1. The transmission process of the communication unit 106 is repeatedly executed at a timing after the calculation result (shared power Dn) is obtained by the calculation unit 104.

Figure 7:
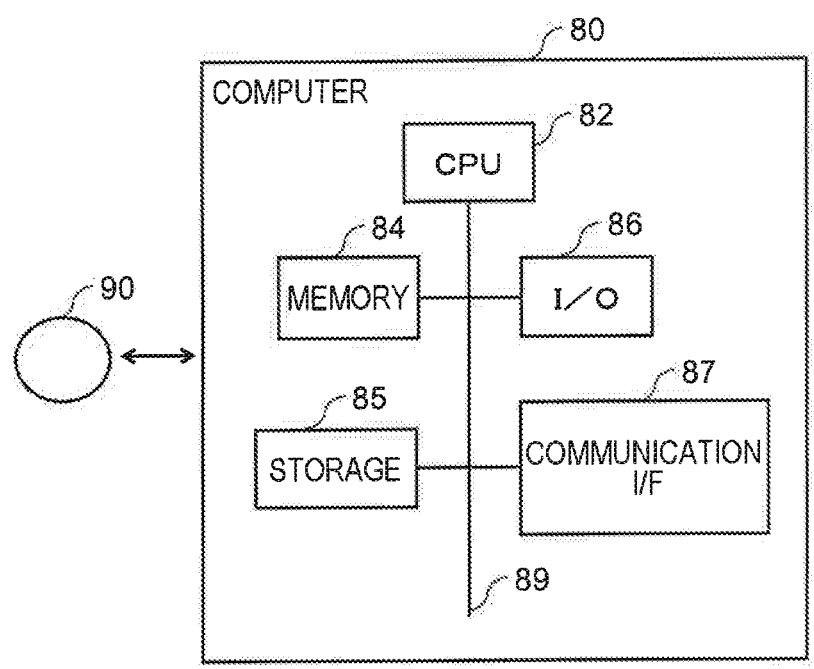
FIG. 7 is a diagram showing an example of a configuration of a computer realizing each apparatus according to the example embodiments of the present invention.

FIG. 7 is a diagram showing an example of a configuration of a computer 80 which realizes each apparatus (control apparatus 10, demand and supply adjustment control apparatus 20, energy storage apparatus 30, power generation apparatus 60, and management apparatus 70) according to the example embodiments of the present invention.

The computer 80 of the present example embodiment includes a central processing unit (CPU) 82, a memory 84, a program 90 which implements the component (each unit) of each apparatus loaded in the memory 84, a storage 85 which stores the program 90, an input/output (I/O) 86, and a network connection interface (communication I/F 87).

The CPU 82, the memory 84, the storage 85, the I/O 86, and the communication I/F 87 are mutually connected through a bus 89, and all the apparatuses are controlled by the CPU 82. However, a method of mutually connecting the CPU 82 and the like is not limited to a bus connection.

The memory 84 is, for example, a random access memory (RAM) or a read only memory (ROM). The storage 85 is a storage device such as a hard disk, a solid state drive (SSD), or a memory card.

The storage 85 may be the memory such as the RAM or the ROM. The storage 85 may be provided inside the computer 80, or provided outside the computer 80 and connected by wire or wirelessly to the computer 80 when the storage is accessible by the computer 80. Alternatively, the storage may be provided in the computer 80 in a detachable manner.

It is possible for the CPU 82 to realize each function of each unit of each apparatus by loading the program 90 stored in the storage 85 into the memory 84 and executing the program.

The I/O 86 performs an input and output control of data and a control signal between the computer 80 and another input and output apparatus. The other input and output apparatus includes, for example, an input apparatus (not shown in the drawings) such as a keyboard, a touch panel, a mouse, or a microphone connected to the computer 80, an output apparatus (not shown in the drawings) such as a display, a printer, or a speaker, and an interface between these input and output apparatuses and the computer 80. Furthermore, the I/O 86 may perform the input and output control of data with a reading or writing apparatus (not shown in the drawings) of another storage medium.

The communication I/F 87 is the network connection interface for communicating between the computer 80 and an external apparatus. The communication I/F 87 may be a network interface for connecting to a wired channel or may be a network interface for connecting to a wireless channel. For example, the computer 80 which realizes the control apparatus 10 is connected to the demand and supply adjustment control apparatus 20 by the communication I/F 87 through the network 50.

Each component of each apparatus of the present example embodiment is realized by a predetermined combination of hardware and software of the computer 80 of FIG. 7. Those skilled in the art will understand that there are various modification examples of the realization method and the apparatus. A function block diagram showing the control apparatus of each example embodiment described below is not a hardware unit configuration but a logical function unit block.

Each apparatus may be configured by a plurality of computers 80 or may be realized by a virtual server.

The computer program 90 of the present example embodiment is described so as to cause the computer 80 which realizes the control apparatus 10 of the example embodiment to execute a procedure for calculating the sharing ratio An of each energy storage apparatus to the adjusted total power Wsum of which the demand and supply is adjusted by the plurality of energy storage apparatuses 30 on the basis of the state information 113 of the corresponding energy storage apparatus 30, a procedure for calculating the shared power Dn in at least one energy storage apparatus 30 using the demand and supply adjustment information relating to the adjusted total power Wsum in the plurality of energy storage apparatuses 30 and the sharing ratio An of the at least one energy storage apparatus 30, and a procedure for transmitting the shared power Dn to the corresponding energy storage apparatus 30.

The computer program 90 of the present example embodiment may be stored in a storage medium readable by the computer 80. The storage medium is not particularly limited thereto, and various forms can be considered. The program 90 may be loaded from the storage medium to the memory 84 of the computer 80, or may be downloaded to the computer 80 through the network and loaded to the memory 84.

The storage medium that stores the computer program 90 includes a non-transitory tangible medium which is usable by the computer 80, and a program code readable by computer 80 is embedded in the medium. When the computer program 90 is executed on the computer 80, the program causes the computer 80 to execute the following control method which realizes the control apparatus 10.

The control method of the control apparatus 10 of the present example embodiment configured in this manner will be described below.

Figure 8:
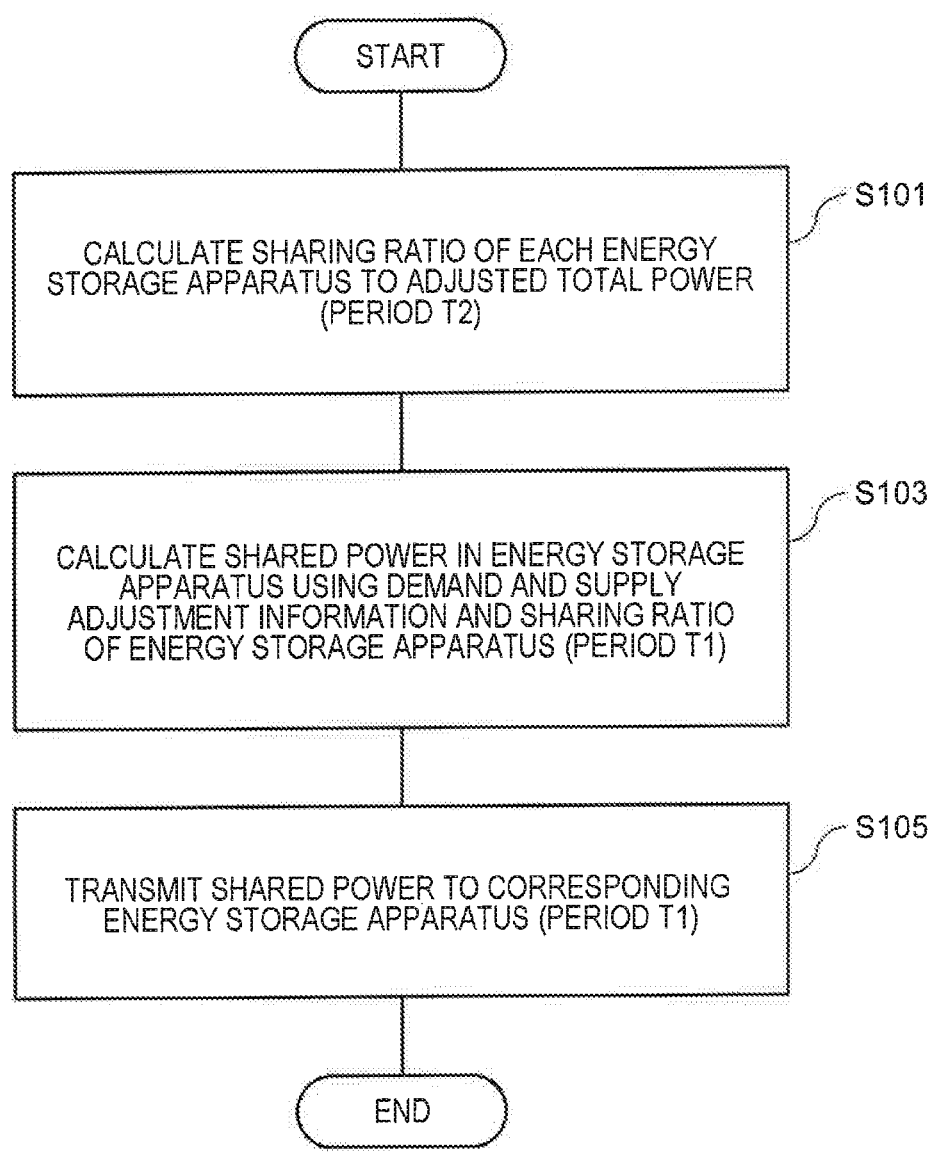
FIG. 8 is a flowchart showing an example of an operation of the control apparatus of the present example embodiment.

FIG. 8 is a flowchart showing an example of an operation of the control apparatus 10 of the present example embodiment.

The control method according to the example embodiment of the present invention is a control method of the control apparatus 10 and is a control method executed by the computer 80 which realizes the control apparatus 10.

The control method of the present example embodiment includes that the control apparatus 10 individually calculates the sharing ratio An of each energy storage apparatus to the adjusted total power Wsum of which the demand and supply is adjusted by the plurality of energy storage apparatuses 30 on the basis of the state information 113 of the corresponding energy storage apparatus 30 (step S101), calculates the shared power Dn in the energy storage apparatus 30 using the demand and supply adjustment information relating to the adjusted total power Wsum in the plurality of energy storage apparatuses 30 and the sharing ratio An of the energy storage apparatus 30 (step S103), and transmits the shared power Dn to the corresponding energy storage apparatus 30 (step S105).

More specifically, the optimization processing unit 102 individually calculates the sharing ratio An of each energy storage apparatus 30 to total power of which the demand and the supply is required to be adjusted by the plurality of energy storage apparatuses 30 on the basis of the state information 113 of the energy storage apparatus 30 (step S101).

At the time, first, the optimization processing unit 102 calculates the sharing ratio An using the state information 113 of each energy storage apparatus 30 acquired by the reception unit 120. As described above, in the present example embodiment, furthermore, the optimization processing unit 102 may calculate the sharing ratio An using also an attribute value with reference to the attribute information 112 of each energy storage apparatus 30.

The calculation unit 104 calculates the shared power Dn in the energy storage apparatus using the demand and supply adjustment information relating to the adjusted total power Wsum and the sharing ratio An of the energy storage apparatus 30 (step S103). The communication unit 106 transmits the shared power Dn which is the calculation result to the corresponding energy storage apparatus 30 (step S105).

In the demand and supply adjustment control apparatus 20 of each energy storage apparatus 30, the charge and discharge control of the secondary battery of the energy storage apparatus 30 is performed on the basis of the shared power Dn received from the control apparatus 10. In the present example embodiment, each energy storage apparatus 30 performs the charge and discharge control of the secondary battery of the energy storage apparatus 30, for example, at a period T0 shorter than the period T1. Therefore, the demand and supply adjustment control apparatus 20 repeatedly performs the control of the energy storage apparatus at the period T0 using the demand and supply adjustment information relating to the same adjusted total power Wsum during the period T1.

In this manner, in the present example embodiment, in step S101, the optimization processing unit 102 updates the sharing ratio An of each energy storage apparatus 30 at the period T2 (about five minutes) on the basis of the state information (SOC, temperature, upper limit output, and the like) of the energy storage apparatus 30.

When the demand and supply adjustment information such as the LFC signal is received at the period T1, the calculation unit 104 individually calculates the shared power Dn (W or Wh) in each energy storage apparatus on the basis of the demand and supply adjustment information and the sharing ratio An for each period T1 in step S103.

Note that, in step S103, the calculation unit 104 repeatedly performs the process of calculating the shared power Dn at the period T1 on the basis of the sharing ratio An and the demand and supply adjustment information using the same sharing ratio An until the sharing ratio An is updated at the period T2.

As described above, in the control apparatus 10 of the present example embodiment, the sharing ratio An of each energy storage apparatus 30 is calculated by the optimization processing unit 102 on the basis of the state information 113 of the energy storage apparatus 30, and the shared power Dn is calculated by the calculation unit 104 using the demand and supply adjustment information such as the LFC signal and the sharing ratio An. The shared power Dn is transmitted by the communication unit 106 to the corresponding energy storage apparatus 30.

In this manner, with the control apparatus 10 of the present example embodiment, since the control apparatus 10 (for example, cloud server) calculates the shared power Dn of each energy storage apparatus 30 and transmits the calculated shared power to each energy storage apparatus 30, it is possible to acquire the shared power Dn at the period T1 at which the LFC signal is transmitted and to accurately execute the charge and discharge control of the energy storage apparatus 30 even in a case where the performance of the demand and supply adjustment control apparatus 20 of the energy storage apparatus 30 is low.

Since the shared power Dn is transmitted by the communication unit 106 at the period T1, it is possible to execute the charge and discharge control using the shared power Dn updated at a reception timing (period T1) of the LFC signal even for an energy storage apparatus 30 controlled by the demand and supply adjustment control apparatus 20 which has a low CPU performance and cannot quickly execute the calculation process and the like by the optimization processing unit 102 and the calculation unit 104. In the demand and supply adjustment system 1 in which various energy storage apparatuses 30 are mixed, it is possible to integrally and efficiently perform the demand and supply adjustment of energy storage apparatuses 30 in the power system.

Second Example Embodiment

Next, the control apparatus according to a second example embodiment of the present invention will be described below.

Figure 9:
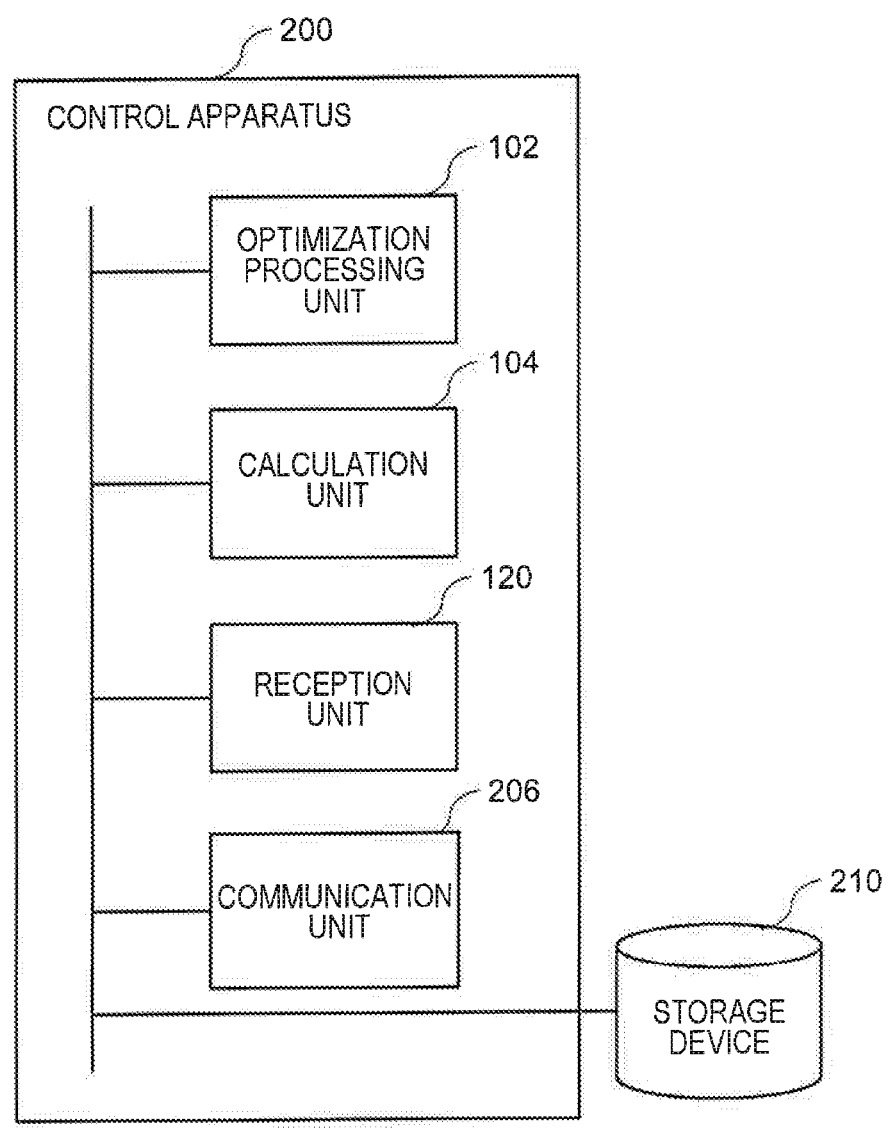
FIG. 9 is a function block diagram showing a logical configuration of the control apparatus according to the example embodiment of the present invention.

FIG. 9 is a function block diagram showing a logical configuration of a control apparatus 200 according to the second example embodiment of the present invention.

The control apparatus 200 of the present example embodiment differs from the control apparatus 10 of the above described example embodiment in that whether the calculation process of the shared power Dn is performed by the control apparatus 200 or the demand and supply adjustment control apparatus 20 is changed according to the performance and the function (supported signal and protocol, provided function, and the like) of the demand and supply adjustment control apparatus 20.

The control apparatus 200 of the present example embodiment includes the optimization processing unit 102, the calculation unit 104, the reception unit 120, and a communication unit 206. Furthermore, the control apparatus 200 is connected to a storage device 210 in an accessible manner. The storage device 210 may be included in the control apparatus 200 or may be an external apparatus.

The optimization processing unit 102, the calculation unit 104, and the reception unit 120 are the same as those in the example embodiment described above. The communication unit 206 has the same function as the communication unit 106 of the example embodiment described above and further has a function of the present example embodiment.

In the control apparatus 200 of the present example embodiment, the plurality of energy storage apparatuses 30 includes a first energy storage apparatus 30a (example: aggregator secondary battery 34) to which the shared power Dn which is the calculation result is required to be transmitted, and a second energy storage apparatus 30b (example: large-scale consumer secondary battery 36 and small-scale consumer secondary battery 38) to which the demand and supply adjustment information and the sharing information for determining the shared power Dn required to be shared by the energy storage apparatus 30 are required to be transmitted instead of the shared power Dn which is the calculation result.

The communication unit 206 transmits the calculation result (shared power Dn) to the first energy storage apparatus 30a and transmits the sharing information and the demand and supply adjustment information to the second energy storage apparatus 30b.

In the present example embodiment, the LFC signal is used as the demand and supply adjustment information, and the sharing coefficient Kn is used as the sharing information.

When the reception unit 120 of the control apparatus 200 receives the LFC signal, the received LFC signal is transferred to the second energy storage apparatus 30b.

As described above using FIGS. 13 and 14, combinations of the demand and supply adjustment information and the sharing information can be considered in three patterns. The above description is the case of pattern C. In the case of pattern A, the adjusted total power Wsum is used as the demand and supply adjustment information, and the sharing ratio An is used as the sharing information. When the reception unit 120 of the control apparatus 200 receives the adjusted total power Wsum, the adjusted total power Wsum is transferred to the second energy storage apparatus 30b.

In the case of pattern B, the adjusted total power Wsum is used as the demand and supply adjustment information, and the sharing coefficient Kn is used as the sharing information. When the reception unit 120 of the control apparatus 200 receives the adjusted total power Wsum, the adjusted total power Wsum is transferred to the second energy storage apparatus 30b. The reception unit 120 of the control apparatus 200 may transmit the maximum adjusted total power Wmax to the second energy storage apparatus 30b.

The communication unit 206 performs the transmission by distinguishing between the first energy storage apparatus 30a to which the shared power Dn is transmitted and the second energy storage apparatus 30b to which the sharing information and the demand and supply adjustment information are transmitted on the basis of a communication quality with each energy storage apparatus 30.

For example, the communication unit 206 determines an energy storage apparatus 30 which communicates through a dedicated channel as the first energy storage apparatus 30a.

The communication unit 206 performs the transmission by distinguishing between the first energy storage apparatus 30a to which the shared power Dn is transmitted and the second energy storage apparatus 30b to which the sharing information and the demand and supply adjustment information are transmitted on the basis of magnitude of the rated capacity of each energy storage apparatus 30.

For example, the communication unit 206 determines a container type large-sized secondary battery (for example, aggregator secondary battery 34) as the first energy storage apparatus 30a.

Alternatively, the communication unit 206 performs the transmission by distinguishing between the first energy storage apparatus 30a to which the shared power Dn is transmitted and the second energy storage apparatus 30b to which the sharing information and the demand and supply adjustment information are transmitted on the basis of a level of performance of the demand and supply adjustment control apparatus 20 in each energy storage apparatus 30.

For example, the communication unit 206 performs the transmission by distinguishing between the first energy storage apparatus 30a to which the shared power Dn is transmitted and the second energy storage apparatus 30b to which the sharing information and the demand and supply adjustment information are transmitted on the basis of a protocol and the number of services supportable by the demand and supply adjustment control apparatus 20.

In the present example embodiment, the communication unit 206 further transfers the demand and supply adjustment information (for example, LFC signal) (hereinafter, in the present example embodiment, referred to as standardized value LFC) received by the reception unit 120 to all demand and supply adjustment control apparatuses 20 by broadcasting. A transfer timing of the LFC signal may be the same as the reception timing or may be executed at the period T1. A timing at which the communication unit 206 transmits the sharing information (sharing ratio An or sharing coefficient Kn. In the present example embodiment, since the standardized value LFC is used as the demand and supply adjustment information, the sharing information is the sharing coefficient Kn) may be the period T2 at which the sharing information is calculated or a period T3 ($\geq$T2) in a case where a time required for the calculation process of the sharing information is equal to or longer than T2. The time of T3 is, for example, ten and several minutes such as 15 minutes. In this manner, the communication unit 206 transmits the sharing information to the second energy storage apparatus 30b of a category C2 at an interval longer than the demand and supply adjustment information (for example, LFC signal).

Note that in the present example embodiment, the optimization processing unit 102 updates the sharing information on the basis of the state of the first energy storage apparatus 30a at an interval longer than the interval at which the communication unit 206 transmits the shared power Dn.

Furthermore, the calculation unit 104 calculates the shared power Dn in the first energy storage apparatus 30a on the basis of the same sharing information and demand and supply adjustment information until the sharing information is updated by the optimization processing unit 102.

On the other hand, on a demand and supply adjustment control apparatus 20 side, the shared power Dn is calculated at the period T1 using the sharing information received at the period T2 (or T3) and the demand and supply adjustment information received at the period T1, and the charge and discharge control of the secondary battery is performed at the period T0.

In the present example embodiment, the storage device 210 stores storage apparatus identification information for identifying the plurality of energy storage apparatuses 30 in association with type identification information for identifying whether an energy storage apparatus 30 corresponding to the storage apparatus identification information is the first energy storage apparatus 30a or the second energy storage apparatus 30b.

The communication unit 206 performs the transmission by distinguishing between the first energy storage apparatus 30a and the second energy storage apparatus 30b using pieces of information stored in the storage device 210.

Note that the storage apparatus identification information may include the communication quality of a communication line between the control apparatus and the energy storage apparatus, whether the communication line is a dedicated line or not, a value of the rated capacity of the energy storage apparatus, whether a form of the energy storage apparatus is the container type or not, the level of performance of the demand and supply adjustment control apparatus, and a protocol and the number of services which are supported by the demand and supply adjustment control apparatus.

FIG. 10 is a diagram showing examples of data structures of the storage device 210 of the present example embodiment.

For example, in the present example embodiment, the first energy storage apparatus 30a is defined as belonging to a category C1, and the second energy storage apparatus 30b is defined as belonging to the category C2. Here, the type identification information for identifying the category C1 and the category C2 is "C1" and "C2".

Here, the first energy storage apparatus 30a of the category C1 is, for example, the aggregator secondary battery 34 (refer to FIG. 1) and a secondary battery which performs the demand and supply adjustment control using the shared power Dn which is the calculation result. The second energy storage apparatus 30b of the category C2 is, for example, the large-scale consumer secondary battery 36 and the small-scale consumer secondary battery 38 (refer to FIG. 1) and a secondary battery on which the demand and supply adjustment control apparatus 20 calculates the shared power Dn using the sharing ratio and the demand and supply adjustment information and then performs the demand and supply adjustment control.

Note that in the example embodiment, there are two categories, but the present invention is not limited thereto. For example, the category of the large-scale consumer secondary battery 36 and the small-scale consumer secondary battery 38 may be separated. In the case, information to be transmitted may be separately determined for each category.

Figure 10A:
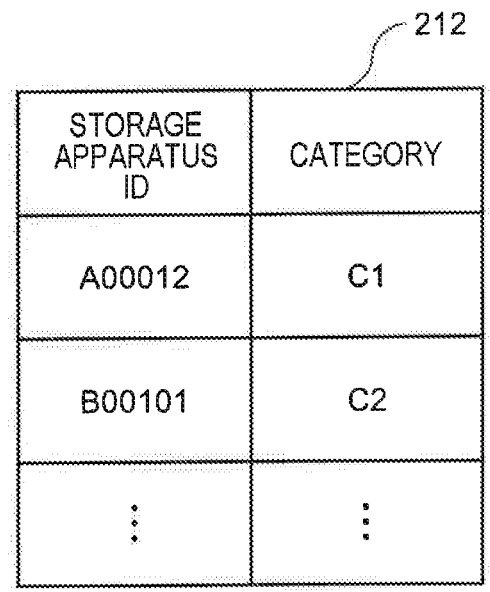
FIG. 10 is a diagram showing examples of data structures of the storage device of the present example embodiment.

In the example of FIG. 10A, as the type information 212 the storage apparatus identification information for identifying the energy storage apparatus 30 and the type identification information for identifying the category to which each energy storage apparatus 30 belongs are stored in association with each other.

Figure 10B:
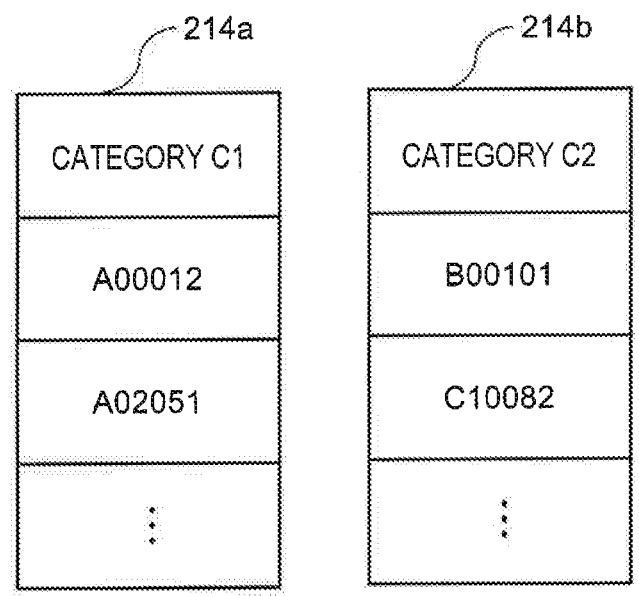

As the example of FIG. 10B, there may be a first table 214a in which the first energy storage apparatuses 30a belonging to the category C1 are listed, and a second table 214b in which the second energy storage apparatuses 30b belonging to the category C2 are listed.

The communication unit 206 selects at least one energy storage apparatus 30 as a transmission destination of corresponding information with reference to the type information 212, or each table 214a or 214b. In the examples of FIG. 10, since the address of the energy storage apparatus 30 is not associated in the type information 212, or each table 214a or 214b, the communication unit 206 acquires the address of each energy storage apparatus 30 with reference to the attribute information 112 and then transmits the corresponding information.

As another example, the address information of each energy storage apparatus 30 may be further associated and stored in the type information 212, or each table 214a or 214b.

In the example described above, the communication unit 206 performs a process of the transmission by distinguishing between an aggregator side secondary battery (for example, aggregator secondary battery 34) and a consumer side secondary battery (for example, large-scale consumer secondary battery 36 and small-scale consumer secondary battery 38). However, in another example, the control apparatus 200 may further include a monitoring unit (not shown in the drawings) which performs a part of the process performed by the communication unit 206, which is distinguishing the secondary batteries.

That is, the process of distinguishing between the first energy storage apparatus 30a and the second energy storage apparatus 30b may be performed by the communication unit 206 or by the separately provided monitoring unit.

In the case where the communication unit 206 performs the distinguishing process, the communication unit 206 performs the distinguishment and the transmission. In the case where the monitoring unit performs the distinguishing process, the monitoring unit performs the distinguishment and the transmission unit 206 performs the transmission according to the distinguishment performed by the monitoring unit.

The process of distinguishing the secondary batteries may be performed on the basis of pieces of information illustrated below, but the present invention is not limited thereto. A plurality of the following pieces of information may be combined.

(b1) Magnitude of Rated Power Output of Secondary Battery PCS

For example, in a case where the rated power output is equal to or larger than a first predetermined value, the secondary battery is determined as the aggregator side secondary battery, and in a case where the rated power output is equal to or less than a second predetermined value, the secondary battery is determined as the consumer side secondary battery. (Here, first predetermined value≥second predetermined value.)

(b2) Owner Information of Secondary Battery

Owner information includes information indicating that the owner of the secondary battery is a power company or the consumer. In a case where the owner information indicates the power company, the secondary battery is determined as the aggregator side secondary battery, and in a case where the owner information indicates the consumer, the secondary battery is determined as the consumer side secondary battery.

(b3) Location where Secondary Battery is Placed

Location information includes position information (address, latitude and longitude, information measured by global positioning system (GPS), or the like) on which the secondary battery is installed, or information indicating whether the secondary battery is inside an electric power substation, outside the electric power substation, in a consumer house, or the like. For example, position information indicating a location of the electric power substation is registered in advance, and in a case where an installation location of the secondary battery is inside a site of the registered electric power substation, the secondary battery is determined as the aggregator side secondary battery. In a case where the secondary battery is outside the site of the electric power substation, the secondary battery is determined as the consumer side secondary battery. Alternatively, an address of the consumer house is registered in advance, and in a case where the installation location of the secondary battery indicates the address of the consumer house, it may be determined that the secondary battery is the consumer side secondary battery.

(b4) Information on Manufacturer (or Sales Company) of Demand and Supply Adjustment Control Apparatus or Secondary Battery and Type Number Thereof Manufacturer information and the type number of the aggregator side secondary battery are registered in advance, and determination is made on the basis of the registration information. Similarly for the demand and supply adjustment control apparatus, the manufacturer information and the type number corresponding to the aggregator side secondary battery are registered in advance, and determination is made on the basis of the registration information.

(b5) Installation Mode of Secondary Battery

An installation mode includes, for example, information indicating whether the secondary battery is installed by rental or purchased. At least any one installation mode of the aggregator side secondary battery or the consumer side secondary battery is registered in advance, and determination is made on the basis of the registration information. For example, a secondary battery installed by rental is determined as the aggregator side secondary battery, and a purchased secondary battery is determined as the consumer side secondary battery.

(b6) Secondary Battery Type

As information indicating a type, for example, information indicating whether a secondary battery is at least any one of redox flow battery, sodium sulfur battery (NAS), nickel-hydrogen secondary battery, lithium-ion rechargeable battery (Lib), or electric vehicle (EV) may be used. The types of the aggregator side secondary battery and the consumer side secondary battery are registered in advance, and determination is made on the basis of the registration information. For example, the redox flow battery, the NAS, and the nickel-hydrogen secondary battery are determined as the aggregator side secondary battery, and the EV is determined as the consumer side secondary battery. The lithium-ion rechargeable battery may be further determined according to the capacity. In a case where the capacity is equal to or larger than a first predetermined value, the secondary battery is determined as the aggregator side secondary battery, and in a case where the capacity is equal to or less than a second predetermined value, the secondary battery is determined as the consumer side secondary battery. (Here, first predetermined value≥second predetermined value.)

(b7) Distributor Information of Secondary Battery

A distributor is a business entity who owns the secondary battery, lends the secondary battery to the consumer, and installs the secondary battery. Information indicating presence or absence of a right of use contract of the secondary battery or information indicating the distributor is registered in advance, and determination is made on the basis of the registration information. For example, the distributor information of the consumer side secondary battery is registered in advance, and determination is made.

(b8) Information on Supported Control Method

Information on a control method includes, for example, information indicating whether the control method is a centralized control or a hierarchical cooperative control. In the case of the centralized control, the secondary battery is determined as the aggregator side secondary battery, and in the case of the hierarchical cooperative control, the secondary battery is determined as the consumer side secondary battery.

Each piece of information described above may be registered in the storage device 110 as, for example, the attribute information 112 or the state information 113 of the energy storage apparatus 30 (secondary battery), or the monitoring unit or the communication unit 206 may acquire each piece of information with reference to the attribute information 112 or the state information 113. Each piece of information may be registered as information different from the attribute information 112 or the state information 113. The rated power output, the installation location, and the like may be determined using current information on the secondary battery collected at any time or periodically.

In the example embodiment, the CPU 82 of the computer 80 can realize each function of the control apparatus 200 by loading the program 90 stored in the storage 85 to the memory 84 and executing the program.

The computer program 90 includes a computer program code which causes the computer 80 to implement the control method of the control apparatus 200 on the control apparatus when the program is executed by the computer 80.

The computer program 90 of the example embodiment is described so as to cause the computer 80 which realizes the control apparatus 200 of the example embodiment to execute the procedure for transmitting the shared power Dn which is the calculation result to the first energy storage apparatus 30a and for transmitting the sharing ratio and the demand and supply adjustment information to the second energy storage apparatus 30b.

The control method of the control apparatus 200 of the example embodiment configured in this manner will be described below.

FIG. 11 is a sequence diagram showing an example of a process flow of each apparatus of the demand and supply adjustment system 1 of the present example embodiment.

The control method according to the example embodiment of the present invention is the control method of the control apparatus 200 and is the control method executed by the computer 80 which realizes the control apparatus 200. The control method of the example embodiment includes that the control apparatus 200 transmits the shared power Dn which is the calculation result to the first energy storage apparatus 30a and transmits the sharing information and the demand and supply adjustment information to the second energy storage apparatus 30b.

More specifically, first, the management apparatus 70 periodically transmits the demand and supply adjustment information to the control apparatus 200 at the period T1 (step S201). The demand and supply adjustment information is received by the reception unit 120 of the control apparatus 200 and is transferred to each energy storage apparatus 30b as it is through the network 50. Note that, while the processes of the energy storage apparatuses 30a and 30b are shown in this figure, the processes are actually performed by the demand and supply adjustment control apparatus 20 which controls each energy storage apparatus 30a and 30b.

The communication unit 206 may simultaneously deliver the demand and supply adjustment information to, for example, the plurality of energy storage apparatuses 30 on the network 50 by broadcasting.

The control apparatus 200 further periodically acquires the state information Sn from each energy storage apparatus 30 through the network 50 at the period T2 (step S203).

In the control apparatus 200, the reception unit 120 receives the state information Sn from each energy storage apparatus 30, and the received state information Sn is stored in the storage device 210.

In the control apparatus 200, the optimization processing unit 102 periodically calculates the sharing information at the period T2 (or T3) on the basis of the demand and supply adjustment information and the state information Sn of the energy storage apparatus 30 (step S205). The sharing information calculated here is transmitted later (step S211) to an energy storage apparatus 30 determined as the category C2 (second energy storage apparatus 30b (example: large-scale consumer secondary battery 36 and small-scale consumer secondary battery 38)).

In the control apparatus 200, the calculation unit 104 calculates the shared power Dn using the demand and supply adjustment information and the sharing information (step S207). The shared power Dn calculated here is transmitted later (step S217) to an energy storage apparatus 30 determined as the category C1 (first energy storage apparatus 30a (example: aggregator secondary battery 34)). The calculation process in step S207 repeatedly operated at the period T1. The communication unit 206 accesses the storage device 210 and determines the type (category) of each energy storage apparatus 30 with reference to the type information 212 (step S209).

FIG. 12 is a diagram showing an example of demand and supply adjustment information 220 of a plurality of secondary batteries managed by the control apparatus 200 of the present example embodiment. The demand and supply adjustment information 220 is stored in the storage device 210. The rated power output Bn (or, upper limit output and power output that can be provided) of each battery is registered in the attribute information 112 in advance. The rated power output Bn (including upper limit output and power output that can be provided) of each secondary battery is multiplied by the sharing information (in this example, sharing ratio An) allocated to each secondary battery to obtain a maximum value of a sharing power output Cn allocated to each secondary battery. Since a value of the shared power Dn of each secondary battery calculated by the calculation unit 104 differs according to a demand and supply adjustment amount indicated by the demand and supply adjustment information, the value is not shown here.

The communication unit 206 transmits the sharing ratio An calculated in step S205 to the energy storage apparatus 30 determined as the category C2 (second energy storage apparatus 30b) (step S211). In the second energy storage apparatus 30b of the category C2, the shared power Dn of the electric power is calculated using the demand and supply adjustment information received in step S201 and the sharing information received in step S211 (step S213). The calculation process is repeatedly executed every time the demand and supply adjustment information is received at the period T1. In the second energy storage apparatus 30b, the process of calculating the shared power Dn is performed at the period T1 on the basis of the sharing information and the demand and supply adjustment information using the same sharing information before the sharing information is received at the period T2. The charge and discharge control of the secondary battery of the energy storage apparatus 30 is performed at the period T0 on the basis of the calculated shared power Dn (step S215).

The communication unit 206 transmits the shared power Dn of the power calculated in step S207 to the energy storage apparatus 30 determined as the category C1 (first energy storage apparatus 30a) (step S217). The transmission process is executed at the period T1. In the first energy storage apparatus 30a of the category C1, the charge and discharge control of the secondary battery of the energy storage apparatus 30 is performed at the period T0 on the basis of the received shared power Dn (step S219).

In this manner, in the example embodiment, in step S205, the optimization processing unit 102 of the control apparatus 200 updates the sharing information of each energy storage apparatus 30 determined as the category C2 (second energy storage apparatus 30b) on the basis of the state information Sn (SOC, rated power output, rated capacity, and the like) of the energy storage apparatus 30 at the period T2 (about five minutes) (or T3).

In step S201, when the reception unit 120 of the control apparatus 200 receives the demand and supply adjustment information at the period T1, the calculation unit 104 calculates the shared power Dn (W or Wh) in each energy storage apparatus determined as the category C1 (first energy storage apparatus 30a) on the basis of the demand and supply adjustment information and the sharing information for each period T1 (step S207).

Note that in each energy storage apparatus 30 determined as the category C2 (second energy storage apparatus 30b), the process of calculating the shared power Dn is performed at the period T1 on the basis of the sharing information and the demand and supply adjustment information using the same sharing information until the sharing information is updated at the period T2 (step S213).

Hereinafter, an arithmetic process of the demand and supply adjustment system 1 of the present example embodiment will be described using FIGS. 13 to 15.

As described above, in the present invention, the combinations of the demand and supply adjustment information and the sharing information can be considered in the following three patterns A, B, and C.

As shown in FIG. 13, the pattern A uses the adjusted total power Wsum of which the demand and supply is required to be adjusted by the plurality of energy storage apparatuses 30 as the demand and supply adjustment information, and uses the sharing ratio An of each energy storage apparatus 30 to the adjusted total power Wsum as the sharing information.

In patterns B and C, the sharing coefficient Kn in consideration of the rated power output Bn (including upper limit output and power output that can be provided) of each energy storage apparatus 30 as the sharing information. In pattern B, the ratio of the adjusted total power Wsum to the maximum adjusted total power Wmax of which the demand and supply is adjustable by the plurality of energy storage apparatuses 30 is used as the demand and supply adjustment information. In pattern C, the standardized value LFC is used as the demand and supply adjustment information.

As shown in FIG. 14, the sharing information calculated in step S205 and the shared power Dn calculated in steps S207 and S213 of FIG. 11 are obtained using different information for each pattern. FIG. 14A shows the pattern A, and the optimization processing unit 102 performs the optimization process using the adjusted total power Wsum and the state information Sn to obtain the sharing ratio An. The calculation unit 104 or the energy storage apparatus 30b multiplies the adjusted total power Wsum by the sharing ratio An to obtain the shared power Dn.

An example of the shared power Dn obtained in this manner is shown in FIG. 15A. It can be seen that a total of the calculated shared power Dn of the plurality of energy storage apparatuses 30 is equal to the adjusted total power Wsum.

Furthermore, FIG. 14B shows the pattern B, and the optimization processing unit 102 performs the optimization process using the adjusted total power Wsum, the state information Sn, the rated power output Bn (including upper limit output and power output that can be provided), and the maximum adjusted total power Wmax to obtain the sharing coefficient Kn. Specifically, the sharing coefficient Kn may be calculated by equation (2) described above.

The calculation unit 104 or the energy storage apparatus 30b multiplies the ratio of the adjusted total power Wsum to the maximum adjusted total power Wmax by the sharing coefficient Kn and the rated power output Bn to obtain the shared power Dn.

An example of the shared power Dn obtained in this manner is shown in FIG. 15B. It can be seen that a total of the calculated shared power Dn of the plurality of energy storage apparatuses 30 is equal to the adjusted total power Wsum.

Furthermore, FIG. 14C shows the pattern C, and the optimization processing unit 102 performs the optimization process using the standardized value LFC, the state information Sn, the rated power output Bn, and the maximum adjusted total power Wmax to obtain the sharing coefficient Kn.

Specifically, the sharing coefficient Kn may be calculated by equation (2) described above.

The calculation unit 104 or the energy storage apparatus 30b multiplies the standardized value LFC by the sharing coefficient Kn and the rated power output Bn to obtain the shared power Dn.

An example of the shared power Dn obtained in this manner is shown in FIG. 15C. It can be seen that a total of the calculated shared power Dn of the plurality of energy storage apparatuses 30 is equal to the adjusted total power Wsum.

As described above, in the control apparatus 200 of the present example embodiment, the plurality of energy storage apparatuses 30 can be separated into the categories C1 and C2, and the communication unit 206 can change information to be transmitted depending on the category. It can be distinguished between the first energy storage apparatus 30a (category C1) which performs up to calculation of the shared power Dn on a cloud server (control apparatus 200) side and transmits the calculated shared power Dn to the demand and supply adjustment control apparatus 20 and the second energy storage apparatus 30b (category C2) which performs up to calculation of the sharing information on a cloud server (control apparatus 200) side and transmits the sharing information and the demand and supply adjustment information to the demand and supply adjustment control apparatus 20.

With this configuration, since the calculation process of the information necessary for the demand and supply adjustment control according to the performance of the demand and supply adjustment control apparatus 20 can be performed not on a demand and supply adjustment control apparatus 20 side but on a server (control apparatus) side, it is possible to avoid a control delay due to low performance, non-execution, or the like, and integrally perform the control.

The example embodiments of the present invention are described with reference to the drawings. However, these are illustrations of the present invention and various configurations other than the above can be employed.

EXAMPLE

Example 1

In the present Example, a configuration which controls an amplitude fluctuation in charge and discharge of the secondary battery in the configuration which performs the demand and supply adjustment control on the basis of the LFC signal will be described.

In the example, when the sharing ratio is calculated, a secondary battery temperature and a SOC value are used as the state information of the energy storage apparatus 30.

First, the optimization processing unit 102 performs the allocation of the sharing ratio to each secondary battery so as to decrease the sharing ratio as the temperature of the secondary battery is high.

Furthermore, in the demand and supply adjustment control, the SOC value fluctuates due to uncertainty of the LFC signal, a charge and discharge loss, or the like. Processes as shown in FIG. 16 are performed on the basis of the SOC value.

Figure 16:
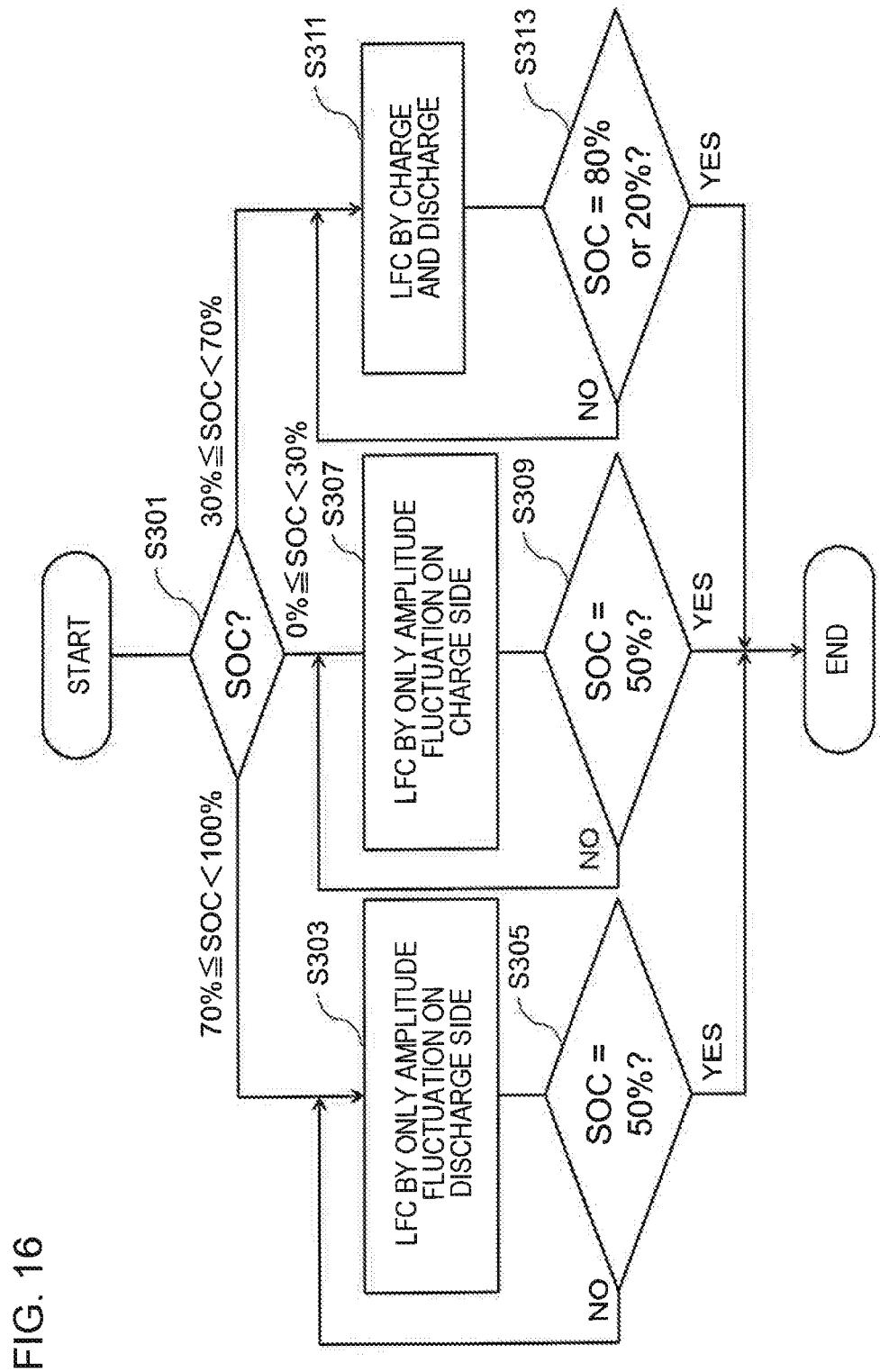
FIG. 16 is a flowchart showing a process procedure of a control apparatus of Examples of the present invention.

FIG. 16 is a flowchart showing a process procedure of a control apparatus of Examples of the present invention.

Here, in a case where the SOC value is within a first predetermined range (70%≤SOC<100% in step S301), the demand and supply adjustment control by the LFC signal is performed by only the amplitude fluctuation on a discharge side (step S303). The processing returns to step S303 to continue this control until the SOC value reaches 50% (NO in step S305). When the SOC value reaches 50% (YES in step S305), a process which stops the control is performed and the flow ends.

In a case where the SOC value is within a second predetermined range (0%≤SOC<30% in step S301), the demand and supply adjustment control by the LFC signal is performed by only the amplitude fluctuation on a charge side (step S307). The processing returns to step S307 to continue this control until the SOC value reaches 50% (NO in step S309). When the SOC value reaches 50% (YES in step S309), the process which stops the control is performed and the flow ends.

In a case where the SOC value is outside the first predetermined range and the second predetermined range (30%≤SOC<70% in step S301), the demand and supply adjustment control by the LFC signal is performed by charge and discharge (step S311). The processing returns to step S311 to continue this control until the SOC value reaches 80% or 20% (NO in step S313). When the SOC value reaches 80% or 20% (YES in step S313), the process which stops the control is performed and the flow ends. With the processes in this manner, it is possible to continuously implement the demand and supply adjustment control using charge and discharge of the secondary battery.

Example 2

The present Example has a configuration that power suppressed by an output suppression instruction of a renewable energy power generation apparatus is charged to the secondary battery in order to avoid output suppression due to the output suppression instruction of the power by the renewable energy power generation apparatus.

In the example, when the sharing ratio is calculated, the secondary battery temperature and the SOC value are used as the state information of the energy storage apparatus 30.

In the present Example, the energy storage apparatus 30 may be used for individual purposes while an output suppression control according to the output suppression instruction is not performed.

In a case where the temperature (may be environment temperature surrounding the secondary battery) of each secondary battery is positive (° C.), the optimization processing unit 102 performs the allocation of the sharing ratio to the secondary battery so as to decrease the sharing ratio as the temperature is high. In a case where the temperature of each secondary battery is negative (° C.), the optimization processing unit 102 performs the allocation of the sharing ratio to the secondary battery so as to increase the sharing ratio as the temperature is low. With this process, it is possible to maintain the secondary battery temperature within an appropriate range even while charge and discharge of the secondary battery is performed.

When the output suppression instruction is received and a time zone in which the output suppression control is executed is determined, the charge and discharge control is performed such that each secondary battery can be continuously charged in all the time zones. That is, a SOC value at a scheduled time in which the output suppression control is executed is estimated. The optimization processing unit 102 calculates the sharing ratio of each energy storage apparatus 30 such that allocation in which a power output at which a predicted free capacity is fully charged in a suppression control time is set as the upper limit is obtained.

The present invention is described with reference to the example embodiments and Examples, but the present invention is not limited to the example embodiments and Examples described above. Various changes which can be understood by those skilled in the art can be made to the configurations and details within the scope of the present invention.

Note that in the present invention, in a case where information relating to a user is acquired or used, this is required to be done in a lawful manner.

Hereinafter, examples of reference modes will be added.

1. A demand and supply adjustment system including:
a demand and supply adjustment control apparatus which controls an energy storage apparatus; and
a control apparatus connected to the demand and supply adjustment control apparatus through a network,
in which the control apparatus includes an optimization processing unit which individually calculates a sharing ratio of each of a plurality of energy storage apparatuses to adjusted total power of which demand and supply is adjusted by the energy storage apparatuses on the basis of state information of the corresponding energy storage apparatus, a calculation unit which calculates shared power in at least one energy storage apparatus using demand and supply adjustment information relating to the adjusted total power in the plurality of energy storage apparatuses and the sharing ratio of the at least one energy storage apparatus, and a communication unit which transmits the shared power to the corresponding energy storage apparatus.

2. The demand and supply adjustment system according to 1, in which the plurality of energy storage apparatuses include a first energy storage apparatus to which the shared power is transmitted and a second energy storage apparatus to which the demand and supply adjustment information and sharing information for determining shared power to be shared by the corresponding energy storage apparatus are transmitted, and in which the communication unit of the control apparatus transmits the shared power to the first energy storage apparatus and transmits the demand and supply adjustment information and the sharing information to the second energy storage apparatus.

3. The demand and supply adjustment system according to 2, in which the communication unit of the control apparatus transmits the sharing ratio as the sharing information to the second energy storage apparatus.

4. The demand and supply adjustment system according to 2, in which the optimization processing unit of the control apparatus calculates a sharing coefficient indicating shared power of each energy storage apparatus obtained from maximum adjusted total power which is a total of power of which the demand and supply is adjustable by the plurality of energy storage apparatuses and the sharing ratio of the energy storage apparatus as a ratio to chargeable and dischargeable power of the energy storage apparatus to set the sharing coefficient as the sharing information, and in which the communication unit of the control apparatus transmits demand and supply adjustment information for determining a ratio of the adjusted total power to the maximum adjusted total power and the sharing information to the second energy storage apparatus.

5. The demand and supply adjustment system according to 4, in which the communication unit of the control apparatus transmits the maximum adjusted total power as the demand and supply adjustment information to the energy storage apparatus.

6. The demand and supply adjustment system according to any one of 1 to 5, in which the communication unit of the control apparatus receives the state information of the energy storage apparatus used for calculating the sharing ratio at an interval longer than an interval at which the shared power is transmitted.

7. The demand and supply adjustment system according to 6, in which the calculation unit of the control apparatus updates the sharing ratio for each energy storage apparatus on the basis of the state information at the interval longer than the interval at which the shared power is transmitted.

8. The demand and supply adjustment system according to 7, in which the calculation unit of the control apparatus calculates the shared power for each energy storage apparatus on the basis of the same sharing ratio until the sharing ratio is updated and the demand and supply adjustment information.

9. The demand and supply adjustment system according to any one of 2 to 8, in which when the demand and supply adjustment information is received, the communication unit of the control apparatus transfers the received demand and supply adjustment information to the second energy storage apparatus.

10. The demand and supply adjustment system according to any one of 2 to 9, in which the optimization processing unit of the control apparatus increases allocation of the shared power to the first energy storage apparatus as compared with allocation of the shared power to the second energy storage apparatus.

11. The demand and supply adjustment system according to any one of 2 to 10, in which the communication unit of the control apparatus distinguishes between the first energy storage apparatus to which the shared power is transmitted and the second energy storage apparatus to which the sharing information and the demand and supply adjustment information are transmitted on the basis of a communication quality with each corresponding energy storage apparatus.

12. The demand and supply adjustment system according to any one of 2 to 11, in which the communication unit of the control apparatus determines the energy storage apparatus which communicates through a dedicated channel as the first energy storage apparatus.

13. The demand and supply adjustment system according to any one of 2 to 12, in which the communication unit of the control apparatus distinguishes between the first energy storage apparatus to which the shared power is transmitted and the second energy storage apparatus to which the sharing information and the demand and supply adjustment information are transmitted on the basis of magnitude of a rated capacity of each corresponding energy storage apparatus.

14. The demand and supply adjustment system according to any one of 2 to 13, in which the communication unit of the control apparatus determines a container type large-sized secondary battery as the first energy storage apparatus.

15. The demand and supply adjustment system according to any one of 2 to 14, in which the communication unit of the control apparatus distinguishes between the first energy storage apparatus to which the shared power is transmitted and the second energy storage apparatus to which the sharing information and the demand and supply adjustment information are transmitted on the basis of a level of performance of the demand and supply adjustment control apparatus in each corresponding energy storage apparatus.

16. The demand and supply adjustment system according to 15, in which the communication unit of the control apparatus distinguishes between the first energy storage apparatus to which the shared power is transmitted and the second energy storage apparatus to which the sharing information and the demand and supply adjustment information are transmitted on the basis of a protocol and the number of services supportable by the demand and supply adjustment control apparatus.

17. The demand and supply adjustment system according to any one of 2 to 16, in which the control apparatus includes a storage unit which stores storage apparatus identification information for identifying the plurality of energy storage apparatuses in association with type identification information for identifying whether an energy storage apparatus corresponding to the storage apparatus identification information is the first energy storage apparatus or the second energy storage apparatus, and in which the communication unit of the control apparatus distinguishes between the first energy storage apparatus and the second energy storage apparatus using information stored in the storage unit.

18. The demand and supply adjustment system according to any one of 2 to 17,
in which the calculation unit of the control apparatus updates the sharing information on the basis of the state of the first energy storage apparatus at the interval longer than the interval at which the communication unit of the control apparatus transmits the shared power.

19. The demand and supply adjustment system according to any one of 2 to 18,
in which the calculation unit of the control apparatus calculates the shared power in the first energy storage apparatus on the basis of the same sharing information until the sharing information is updated and the demand and supply adjustment information.

20. The demand and supply adjustment system according to any one of 2 to 19,
in which the communication unit of the control apparatus transmits the sharing information to the second energy storage apparatus at frequency less than the demand and supply adjustment information.

21. The demand and supply adjustment system according to any one of 2 to 20,
in which the communication unit of the control apparatus selects the at least one energy storage apparatus as a transmission destination using a storage unit which stores storage apparatus identification information for identifying the plurality of energy storage apparatuses in association with type identification information for identifying whether an energy storage apparatus corresponding to the storage apparatus identification information is the first energy storage apparatus or the second energy storage apparatus.

22. A control method executed by a control apparatus, the control method including:
individually calculating a sharing ratio of each of a plurality of energy storage apparatuses to adjusted total power of which demand and supply is adjusted by the energy storage apparatuses on the basis of state information of the corresponding energy storage apparatus;
calculating shared power in at least one energy storage apparatus using demand and supply adjustment information relating to the adjusted total power in the plurality of energy storage apparatuses and the sharing ratio of the at least one energy storage apparatus; and
transmitting the shared power to the corresponding energy storage apparatus.

23. The control method executed by the control apparatus according to 22,
in which the plurality of energy storage apparatuses include a first energy storage apparatus to which the shared power is transmitted and a second energy storage apparatus to which the demand and supply adjustment information and sharing information for determining shared power to be shared by the energy storage apparatus are transmitted,
the control method further including:
transmitting the shared power to the first energy storage apparatus and transmits the demand and supply adjustment information and the sharing information to the second energy storage apparatus.

24. The control method executed by the control apparatus according to 23, further including:
transmitting the sharing ratio as the sharing information to the second energy storage apparatus.

25. The control method executed by the control apparatus according to 23, further including:
calculating a sharing coefficient indicating shared power of each energy storage apparatus obtained from maximum adjusted total power which is a total of power of which the demand and supply is adjustable by the plurality of energy storage apparatuses and the sharing ratio of the energy storage apparatus as a ratio to chargeable and dischargeable power of the energy storage apparatus to set the sharing coefficient as the sharing information; and
transmitting demand and supply adjustment information for determining a ratio of the adjusted total power to the maximum adjusted total power and the sharing information to the second energy storage apparatus.

26. The control method executed by the control apparatus according to 25, further including:
transmitting the maximum adjusted total power as the demand and supply adjustment information to the energy storage apparatus.

27. The control method executed by the control apparatus according to any one of 22 to 26, further including:
receiving the state information of the energy storage apparatus used for calculating the sharing ratio at an interval longer than an interval at which the shared power is transmitted.

28. The control method executed by the control apparatus according to 27, further including:
updating the sharing ratio for each energy storage apparatus on the basis of the state information at the interval longer than the interval at which the shared power is transmitted.

29. The control method executed by the control apparatus according to 28, further including:
calculating the shared power for each energy storage apparatus on the basis of the same sharing ratio until the sharing ratio is updated and the demand and supply adjustment information.

30. The control method executed by the control apparatus according to any one of 23 to 29, further including:
transferring, when the demand and supply adjustment information is received, the received demand and supply adjustment information to the second energy storage apparatus.

31. The control method executed by the control apparatus according to any one of 23 to 30, further including:
increasing allocation of the shared power to the first energy storage apparatus as compared with allocation of the shared power to the second energy storage apparatus.

32. The control method executed by the control apparatus according to any one of 23 to 31, further including:
distinguishing between the first energy storage apparatus to which the shared power is transmitted and the second energy storage apparatus to which the sharing information and the demand and supply adjustment information are transmitted on the basis of a communication quality with each corresponding energy storage apparatus.

33. The control method executed by the control apparatus according to any one of 23 to 32,
in which the energy storage apparatus which communicates through a dedicated channel is set as the first energy storage apparatus.

34. The control method executed by the control apparatus according to any one of 23 to 33, further including:
distinguishing between the first energy storage apparatus to which the shared power is transmitted and the second energy storage apparatus to which the sharing information and the demand and supply adjustment information are transmitted on the basis of magnitude of a rated capacity of each corresponding energy storage apparatus.

35. The control method executed by the control apparatus according to any one of 23 to 34, in which a container type large-sized secondary battery is set as the first energy storage apparatus.

36. The control method executed by the control apparatus according to any one of 23 to 35, further including:

distinguishing between the first energy storage apparatus to which the shared power is transmitted and the second energy storage apparatus to which the sharing information and the demand and supply adjustment information are transmitted on the basis of a level of performance of a demand and supply adjustment control apparatus in each corresponding energy storage apparatus.

37. The control method executed by the control apparatus according to 36, further including:

distinguishing between the first energy storage apparatus to which the shared power is transmitted and the second energy storage apparatus to which the sharing information and the demand and supply adjustment information are transmitted on the basis of a protocol and the number of services supportable by the demand and supply adjustment control apparatus.

38. The control method executed by the control apparatus according to any one of 23 to 37, further including:

storing storage apparatus identification information for identifying the plurality of energy storage apparatuses in association with type identification information for identifying whether an energy storage apparatus corresponding to the storage apparatus identification information is the first energy storage apparatus or the second energy storage apparatus in a storage apparatus, and distinguishes between the first energy storage apparatus and the second energy storage apparatus using information stored in the storage apparatus.

39. The control method executed by the control apparatus according to any one of 23 to 38, further including:

updating the sharing information on the basis of the state of the first energy storage apparatus at the interval longer than the interval at which the shared power is transmitted.

40. The control method executed by the control apparatus according to any one of 23 to 39, further including:

calculating the shared power in the first energy storage apparatus on the basis of the same sharing information until the sharing information is updated and the demand and supply adjustment information.

41. The control method executed by the control apparatus according to any one of 23 to 40, further including:

transmitting the sharing information to the second energy storage apparatus at frequency less than the demand and supply adjustment information.

42. The control method executed by the control apparatus according to any one of 23 to 41, further including:

selecting the at least one energy storage apparatus as a transmission destination using a storage apparatus which stores storage apparatus identification information for identifying the plurality of energy storage apparatuses in association with type identification information for identifying whether an energy storage apparatus corresponding to the storage apparatus identification information is the first energy storage apparatus or the second energy storage apparatus.

43. A program causing a computer to execute:

a procedure of individually calculating a sharing ratio of each of a plurality of energy storage apparatuses to adjusted total power of which demand and supply is adjusted by the energy storage apparatuses on the basis of state information of the corresponding energy storage apparatus;

a procedure of calculating shared power in at least one energy storage apparatus using demand and supply adjustment information relating to the adjusted total power in the plurality of energy storage apparatuses and the sharing ratio of the at least one energy storage apparatus; and a procedure of transmitting the shared power to the corresponding energy storage apparatus.

44. The program according to 43, in which the plurality of energy storage apparatuses include a first energy storage apparatus to which the shared power is transmitted and a second energy storage apparatus to which the demand and supply adjustment information and sharing information for determining shared power to be shared by the energy storage apparatus are transmitted, the program causing the computer to further execute a procedure of transmitting the shared power to the first energy storage apparatus and transmits the demand and supply adjustment information and the sharing information to the second energy storage apparatus.

45. The program according to 44, causing the computer to further execute a procedure of transmitting the sharing ratio as the sharing information to the second energy storage apparatus.

46. The program according to 44, causing the computer to further execute:

a procedure of calculating a sharing coefficient indicating shared power of each energy storage apparatus obtained from maximum adjusted total power which is a total of power of which the demand and supply is adjustable by the plurality of energy storage apparatuses and the sharing ratio of the energy storage apparatus as a ratio to chargeable and dischargeable power of the energy storage apparatus to set the sharing coefficient as the sharing information; and a procedure of transmitting demand and supply adjustment information for determining a ratio of the adjusted total power to the maximum adjusted total power and the sharing information to the second energy storage apparatus.

47. The program according to 46, causing the computer to further execute a procedure of transmitting the maximum adjusted total power as the demand and supply adjustment information to the energy storage apparatus.

48. The program according to any one of 43 to 47, causing the computer to further execute a procedure of receiving the state information of the energy storage apparatus used for calculating the sharing ratio at an interval longer than an interval at which the shared power is transmitted.

49. The program according to 48, causing the computer to further execute a procedure of updating the sharing ratio for each energy storage apparatus on the basis of the state information at the interval longer than the interval at which the shared power is transmitted.

50. The program according to 49, causing the computer to further execute a procedure of calculating the shared power for each energy storage apparatus on the basis of the same sharing ratio until the sharing ratio is updated and the demand and supply adjustment information.

51. The program according to any one of 44 to 50, causing the computer to further execute a procedure of transferring, when the demand and supply adjustment information is received, the received demand and supply adjustment information to the second energy storage apparatus.

52. The program according to any one of 44 to 51, causing the computer to further execute a procedure of increasing allocation of the shared power to the first energy storage apparatus as compared with allocation of the shared power to the second energy storage apparatus.

53. The program according to any one of 44 to 52, causing the computer to further execute a procedure of distinguishing between the first energy storage apparatus to which the shared power is transmitted and the second energy storage apparatus to which the sharing information and the demand and supply adjustment information are transmitted on the basis of a communication quality with each corresponding energy storage apparatus.

54. The program according to any one of 44 to 53, causing the computer to further execute a procedure of determining the energy storage apparatus which communicates through a dedicated channel as the first energy storage apparatus.

55. The program according to any one of 44 to 54, causing the computer to further execute a procedure of distinguishing between the first energy storage apparatus to which the shared power is transmitted and the second energy storage apparatus to which the sharing information and the demand and supply adjustment information are transmitted on the basis of magnitude of a rated capacity of each corresponding energy storage apparatus.

56. The program according to any one of 44 to 55, causing the computer to further execute a procedure of determining a container type large-sized secondary battery as the first energy storage apparatus.

57. The program according to any one of 44 to 56, causing the computer to further execute a procedure of distinguishing between the first energy storage apparatus to which the shared power is transmitted and the second energy storage apparatus to which the sharing information and the demand and supply adjustment information are transmitted on the basis of a level of performance of a demand and supply adjustment control apparatus in each corresponding energy storage apparatus.

58. The program according to 57, causing the computer to further execute a procedure of distinguishing between the first energy storage apparatus to which the shared power is transmitted and the second energy storage apparatus to which the sharing information and the demand and supply adjustment information are transmitted on the basis of a protocol and the number of services supportable by the demand and supply adjustment control apparatus.

59. The program according to any one of 44 to 58, causing the computer to further execute:
a procedure of storing storage apparatus identification information for identifying the plurality of energy storage apparatuses in association with type identification information for identifying whether an energy storage apparatus corresponding to the storage apparatus identification information is the first energy storage apparatus or the second energy storage apparatus in a storage apparatus; and
a procedure of distinguishing between the first energy storage apparatus and the second energy storage apparatus using information stored in the storage apparatus.

60. The program according to any one of 44 to 59, causing the computer to further execute a procedure of updating the sharing information on the basis of the state of the first energy storage apparatus at the interval longer than the interval at which the shared power is transmitted.

61. The program according to any one of 44 to 60, causing the computer to further execute a procedure of calculating the shared power in the first energy storage apparatus on the basis of the same sharing information until the sharing information is updated and the demand and supply adjustment information.

62. The program according to any one of 44 to 61, causing the computer to further execute a procedure of transmitting the sharing information to the second energy storage apparatus at frequency less than the demand and supply adjustment information.

63. The program according to any one of 44 to 62, causing the computer to further execute a procedure of selecting the at least one energy storage apparatus as a transmission destination using a storage apparatus which stores storage apparatus identification information for identifying the plurality of energy storage apparatuses in association with type identification information for identifying whether an energy storage apparatus corresponding to the storage apparatus identification information is the first energy storage apparatus or the second energy storage apparatus.

64. A control apparatus including:
an optimization processing unit which calculates a sharing ratio of each of a plurality of energy storage apparatuses to adjusted total power of which demand and supply is adjusted by the energy storage apparatuses on the basis of state information of the energy storage apparatus;
a calculation unit which calculates shared power in at least one energy storage apparatus using demand and supply adjustment information relating to the adjusted total power in the plurality of energy storage apparatuses and the sharing ratio of the at least one energy storage apparatus; and
a communication unit which transmits the shared power to the corresponding energy storage apparatus.

65. The control apparatus according to 64,
in which the plurality of energy storage apparatuses include a first energy storage apparatus to which the shared power is transmitted and a second energy storage apparatus to which the demand and supply adjustment information and sharing information for determining shared power to be shared by the energy storage apparatus are transmitted, and
in which the communication unit transmits the shared power to the first energy storage apparatus and transmits the demand and supply adjustment information and the sharing information to the second energy storage apparatus.

66. The control apparatus according to 65,
in which the communication unit transmits the sharing ratio as the sharing information to the second energy storage apparatus.

67. The control apparatus according to 65,
in which the optimization processing unit calculates a sharing coefficient indicating shared power of each energy storage apparatus obtained from maximum adjusted total power which is a total of power of which the demand and supply is adjustable by the plurality of energy storage apparatuses and the sharing ratio of the energy storage apparatus as a ratio to chargeable and dischargeable power of the energy storage apparatus to set the sharing coefficient as the sharing information, and
in which the communication unit transmits demand and supply adjustment information for determining a ratio of the adjusted total power to the maximum adjusted total power and the sharing information to the second energy storage apparatus.

68. The control apparatus according to 67,
in which the communication unit transmits the maximum adjusted total power as the demand and supply adjustment information to the energy storage apparatus.

69. The control apparatus according to any one of 64 to 68,
in which the communication unit receives the state information of the energy storage apparatus used for calculating the sharing ratio at an interval longer than an interval at which the shared power is transmitted.

70. The control apparatus according to 69,
in which the calculation unit updates the sharing ratio for each energy storage apparatus on the basis of the state information at the interval longer than the interval at which the shared power is transmitted.

71. The control apparatus according to 70,
in which the calculation unit calculates the shared power for each energy storage apparatus on the basis of the same sharing ratio until the sharing ratio is updated and the demand and supply adjustment information.

72. The control apparatus according to any one of 65 to 71,
in which when the demand and supply adjustment information is received, the communication unit transfers the received demand and supply adjustment information to the second energy storage apparatus.

73. The control apparatus according to any one of 65 to 72,
in which the optimization processing unit increases allocation of the shared power to the first energy storage apparatus as compared with allocation of the shared power to the second energy storage apparatus.

74. The control apparatus according to any one of 65 to 73,
in which the communication unit distinguishes between the first energy storage apparatus to which the shared power is transmitted and the second energy storage apparatus to which the sharing information and the demand and supply adjustment information are transmitted on the basis of a communication quality with each corresponding energy storage apparatus.

75. The control apparatus according to any one of 65 to 74,
in which the communication unit determines the energy storage apparatus which communicates through a dedicated channel as the first energy storage apparatus.

76. The control apparatus according to any one of 65 to 75,
in which the communication unit distinguishes between the first energy storage apparatus to which the shared power is transmitted and the second energy storage apparatus to which the sharing information and the demand and supply adjustment information are transmitted on the basis of magnitude of a rated capacity of each corresponding energy storage apparatus.

77. The control apparatus according to any one of 65 to 76,
in which the communication unit determines a container type large-sized secondary battery as the first energy storage apparatus.

78. The control apparatus according to any one of 65 to 77,
in which the communication unit distinguishes between the first energy storage apparatus to which the shared power is transmitted and the second energy storage apparatus to which the sharing information and the demand and supply adjustment information are transmitted on the basis of a level of performance of a demand and supply adjustment control apparatus in each corresponding energy storage apparatus.

79. The control apparatus according to 78,
in which the communication unit distinguishes between the first energy storage apparatus to which the shared power is transmitted and the second energy storage apparatus to which the sharing information and the demand and supply adjustment information are transmitted on the basis of a protocol and the number of services supportable by the demand and supply adjustment control apparatus.

80. The control apparatus according to any one of 65 to 79, further including:
a storage unit which stores storage apparatus identification information for identifying the plurality of energy storage apparatuses in association with type identification information for identifying whether an energy storage apparatus corresponding to the storage apparatus identification information is the first energy storage apparatus or the second energy storage apparatus,
in which the communication unit distinguishes between the first energy storage apparatus and the second energy storage apparatus using information stored in the storage unit.

81. The control apparatus according to any one of 65 to 80,
in which the calculation unit updates the sharing information on the basis of the state of the first energy storage apparatus at the interval longer than the interval at which the communication unit transmits the shared power.

82. The control apparatus according to any one of 65 to 81,
in which the calculation unit calculates the shared power in the first energy storage apparatus on the basis of the same sharing information until the sharing information is updated and the demand and supply adjustment information.

83. The control apparatus according to any one of 65 to 82,
in which the communication unit transmits the sharing information to the second energy storage apparatus at frequency less than the demand and supply adjustment information.

84. The control apparatus according to any one of 65 to 83,
in which the communication unit selects the at least one energy storage apparatus as a transmission destination using a storage unit which stores storage apparatus identification information for identifying the plurality of energy storage apparatuses in association with type identification information for identifying whether an energy storage apparatus corresponding to the storage apparatus identification information is the first energy storage apparatus or the second energy storage apparatus.

Some or all of the example embodiments described above may be further described as follows, but the present invention is not limited to the following.

1. A control apparatus including:
an optimization processing unit which calculates a sharing ratio of each of a plurality of energy storage apparatuses to adjusted total power of which demand and supply is adjusted by the energy storage apparatuses on the basis of state information of the energy storage apparatus;
a calculation unit which calculates shared power in at least one energy storage apparatus using demand and supply adjustment information relating to the adjusted total power in the plurality of energy storage apparatuses and the sharing ratio of the at least one energy storage apparatus; and
a communication unit which transmits the shared power to the corresponding energy storage apparatus.

2. The control apparatus according to 1,
in which update frequency of the sharing ratio is lower than update frequency of the demand and supply adjustment information, and
in which the calculation unit calculates the shared power for each energy storage apparatus using the same sharing ratio until the sharing ratio is updated and the demand and supply adjustment information.

3. The control apparatus according to 1 or 2,
in which the plurality of energy storage apparatuses include a first energy storage apparatus to which the shared power is transmitted and a second energy storage apparatus to which the demand and supply adjustment information and sharing information for determining shared power to be shared by the energy storage apparatus are transmitted, and in which the communication unit transmits the shared power to the first energy storage apparatus and transmits the demand and supply adjustment information and the sharing information to the second energy storage apparatus.

4. The control apparatus according to 3, in which the communication unit selects the at least one energy storage apparatus as a transmission destination using a storage unit which stores storage apparatus identification information for identifying the plurality of energy storage apparatuses in association with type identification information for identifying whether an energy storage apparatus corresponding to the storage apparatus identification information is the first energy storage apparatus or the second energy storage apparatus.

5. The control apparatus according to 3, further including:

a storage unit which stores storage apparatus identification information for identifying the plurality of energy storage apparatuses in association with type identification information for identifying whether an energy storage apparatus corresponding to the storage apparatus identification information is the first energy storage apparatus or the second energy storage apparatus, in which the communication unit performs the transmission by distinguishing between the first energy storage apparatus and the second energy storage apparatus using information stored in the storage unit.

6. The control apparatus according to 3, in which the communication unit performs the transmission by distinguishing between the first energy storage apparatus to which the shared power is transmitted and the second energy storage apparatus to which the sharing information and the demand and supply adjustment information are transmitted on the basis of a communication quality with each energy storage apparatus.

7. The control apparatus according to 3 or 6, in which the communication unit determines the energy storage apparatus which communicates through a dedicated channel as the first energy storage apparatus.

8. The control apparatus according to 3, in which the communication unit performs the transmission by distinguishing between the first energy storage apparatus to which the shared power is transmitted and the second energy storage apparatus to which the sharing information and the demand and supply adjustment information are transmitted on the basis of magnitude of a rated capacity of each energy storage apparatus.

9. The control apparatus according to 3, in which the communication unit determines a container type large-sized secondary battery as the first energy storage apparatus.

10. The control apparatus according to 3, in which the communication unit performs the transmission by distinguishing between the first energy storage apparatus to which the shared power is transmitted and the second energy storage apparatus to which the sharing information and the demand and supply adjustment information are transmitted on the basis of a level of performance of a demand and supply adjustment control apparatus in each energy storage apparatus.

11. The control apparatus according to 10, in which the communication unit performs the transmission by distinguishing between the first energy storage apparatus to which the shared power is transmitted and the second energy storage apparatus to which the sharing information and the demand and supply adjustment information are transmitted on the basis of a protocol and the number of services supportable by the demand and supply adjustment control apparatus.

12. The control apparatus according to any one of 3 to 11, in which the communication unit transmits the sharing ratio as the sharing information to the second energy storage apparatus.

13. The control apparatus according to any one of 3 to 11, in which the optimization processing unit calculates, for each energy storage apparatus, a sharing coefficient indicated by a ratio of maximum adjusted total power which is a total of power of which the demand and supply is adjustable by the plurality of energy storage apparatuses to chargeable and dischargeable power of the energy storage apparatus to set the sharing coefficient as the sharing information, in which the communication unit transmits demand and supply adjustment information for determining a ratio of the adjusted total power to the maximum adjusted total power and the sharing information to the second energy storage apparatus, and in which the shared power of each energy storage apparatus is obtained from the ratio of the adjusted total power to the maximum adjusted total power, the sharing coefficient of each energy storage apparatus, and the chargeable and dischargeable power of the energy storage apparatus.

14. The control apparatus according to 13, in which the communication unit transmits the maximum adjusted total power as the demand and supply adjustment information to the energy storage apparatus.

15. The control apparatus according to any one of 1 to 14, in which the communication unit receives the state information of the energy storage apparatus used for calculating the sharing ratio at an interval longer than an interval at which the shared power or the demand and supply adjustment information is transmitted.

16. The control apparatus according to 15, in which the calculation unit updates the sharing information for each energy storage apparatus on the basis of the state information at the interval longer than the interval at which the shared power or the demand and supply adjustment information is transmitted.

17. The control apparatus according to any one of 3 to 16, in which when the demand and supply adjustment information is received, the communication unit transfers the received demand and supply adjustment information as it is or after standardizing the received demand and supply adjustment information on the basis of the maximum adjusted total power and the adjusted total power, to the second energy storage apparatus.

18. The control apparatus according to any one of 3 to 17, in which the optimization processing unit increases allocation of the shared power to the first energy storage apparatus as compared with allocation of the shared power to the second energy storage apparatus.

19. The control apparatus according to any one of 3 to 18, in which the communication unit transmits the sharing information to the second energy storage apparatus at an interval shorter than the demand and supply adjustment information.

20. A demand and supply adjustment system including:

a demand and supply adjustment control apparatus which controls an energy storage apparatus; and a control apparatus connected to the demand and supply adjustment control apparatus through a network, in which the control apparatus includes an optimization processing unit which calculates a sharing ratio of each of a plurality of energy storage apparatuses to adjusted total power of which demand and supply is adjusted by the energy storage apparatuses on the basis of state information of the energy storage apparatus, a calculation unit which calculates shared power in at least one energy storage apparatus using demand and supply adjustment information relating to the adjusted total power in the plurality of energy storage apparatuses and the sharing ratio of the at least one energy storage apparatus, and a communication unit which transmits the shared power to the corresponding energy storage apparatus.

21. The demand and supply adjustment system according to 20, in which update frequency of the sharing ratio is lower than update frequency of the demand and supply adjustment information, and in which the calculation unit of the control apparatus calculates the shared power for each energy storage apparatus on the basis of the same sharing ratio until the sharing ratio is updated and the demand and supply adjustment information.

22. The demand and supply adjustment system according to 20 or 21, in which the plurality of energy storage apparatuses include a first energy storage apparatus to which the shared power is transmitted and a second energy storage apparatus to which the demand and supply adjustment information and sharing information for determining shared power to be shared by the energy storage apparatus are transmitted, and in which the communication unit of the control apparatus transmits the shared power to the first energy storage apparatus and transmits the demand and supply adjustment information and the sharing information to the second energy storage apparatus.

23. The demand and supply adjustment system according to 22, in which the communication unit of the control apparatus selects the at least one energy storage apparatus as a transmission destination using a storage unit which stores storage apparatus identification information for identifying the plurality of energy storage apparatuses in association with type identification information for identifying whether an energy storage apparatus corresponding to the storage apparatus identification information is the first energy storage apparatus or the second energy storage apparatus.

24. The demand and supply adjustment system according to 22, in which the control apparatus includes a storage unit which stores storage apparatus identification information for identifying the plurality of energy storage apparatuses in association with type identification information for identifying whether an energy storage apparatus corresponding to the storage apparatus identification information is the first energy storage apparatus or the second energy storage apparatus, and in which the communication unit of the control apparatus performs the transmission by distinguishing between the first energy storage apparatus and the second energy storage apparatus using information stored in the storage unit.

25. The demand and supply adjustment system according to 22, in which the communication unit of the control apparatus performs the transmission by distinguishing between the first energy storage apparatus to which the shared power is transmitted and the second energy storage apparatus to which the sharing information and the demand and supply adjustment information are transmitted on the basis of a communication quality with each energy storage apparatus.

26. The demand and supply adjustment system according to 22 or 25, in which the communication unit of the control apparatus determines the energy storage apparatus which communicates through a dedicated channel as the first energy storage apparatus.

27. The demand and supply adjustment system according to 22, in which the communication unit of the control apparatus performs the transmission by distinguishing between the first energy storage apparatus to which the shared power is transmitted and the second energy storage apparatus to which the sharing information and the demand and supply adjustment information are transmitted on the basis of magnitude of a rated capacity of each energy storage apparatus.

28. The demand and supply adjustment system according to 22, in which the communication unit of the control apparatus determines a container type large-sized secondary battery as the first energy storage apparatus.

29. The demand and supply adjustment system according to 22, in which the communication unit of the control apparatus performs the transmission by distinguishing between the first energy storage apparatus to which the shared power is transmitted and the second energy storage apparatus to which the sharing information and the demand and supply adjustment information are transmitted on the basis of a level of performance of a demand and supply adjustment control apparatus in each energy storage apparatus.

30. The demand and supply adjustment system according to 29, in which the communication unit of the control apparatus performs the transmission by distinguishing between the first energy storage apparatus to which the shared power is transmitted and the second energy storage apparatus to which the sharing information and the demand and supply adjustment information are transmitted on the basis of a protocol and the number of services supportable by the demand and supply adjustment control apparatus.

31. The demand and supply adjustment system according to any one of 22 to 30, in which the communication unit of the control apparatus transmits the sharing ratio as the sharing information to the second energy storage apparatus.

32. The demand and supply adjustment system according to any one of 22 to 30, in which the optimization processing unit of the control apparatus calculates, for each energy storage apparatus, a sharing coefficient indicated by a ratio of maximum adjusted total power which is a total of power of which the demand and supply is adjustable by the plurality of energy storage apparatuses to chargeable and dischargeable power of the energy storage apparatus to set the sharing coefficient as the sharing information, in which the communication unit of the control apparatus transmits demand and supply adjustment information for determining a ratio of the adjusted total power to the maximum adjusted total power and the sharing information to the second energy storage apparatus, and in which the shared power of each energy storage apparatus is obtained from the ratio of the adjusted total power to the maximum adjusted total power, the sharing coefficient of each energy storage apparatus, and the chargeable and dischargeable power of the energy storage apparatus.

33. The demand and supply adjustment system according to 32, in which the communication unit of the control apparatus transmits the maximum adjusted total power as the demand and supply adjustment information to the energy storage apparatus.

34. The demand and supply adjustment system according to any one of 20 to 33, in which the communication unit of the control apparatus receives the state information of the energy storage apparatus used for calculating the sharing ratio at an interval longer than an interval at which the shared power or the demand and supply adjustment information is transmitted.

35. The demand and supply adjustment system according to 34, in which the calculation unit of the control apparatus updates the sharing information for each energy storage apparatus on the basis of the state information at the interval longer than the interval at which the shared power or the demand and supply adjustment information is transmitted.

36. The demand and supply adjustment system according to any one of 22 to 35, in which when the demand and supply adjustment information is received, the communication unit of the control apparatus transfers the received demand and supply adjustment information as it is or after standardizing the received demand and supply adjustment information on the basis of the maximum adjusted total power and the adjusted total power, to the second energy storage apparatus.

37. The demand and supply adjustment system according to any one of 22 to 36, in which the optimization processing unit of the control apparatus increases allocation of the shared power to the first energy storage apparatus as compared with allocation of the shared power to the second energy storage apparatus.

38. The demand and supply adjustment system according to any one of 22 to 37, in which the communication unit of the control apparatus transmits the sharing information to the second energy storage apparatus at an interval shorter than the demand and supply adjustment information.

39. A control method executed by a control apparatus, including:

calculating a sharing ratio of each of a plurality of energy storage apparatuses to adjusted total power of which demand and supply is adjusted by the energy storage apparatuses on the basis of state information of the energy storage apparatus;

calculating shared power in at least one energy storage apparatus using demand and supply adjustment information relating to the adjusted total power in the plurality of energy storage apparatuses and the sharing ratio of the at least one energy storage apparatus; and transmitting the shared power to the corresponding energy storage apparatus.

40. The control method executed by the control apparatus according to 39, in which update frequency of the sharing ratio is lower than update frequency of the demand and supply adjustment information, the control method further including:

calculating the shared power for each energy storage apparatus on the basis of the same sharing ratio until the sharing ratio is updated and the demand and supply adjustment information.

41. The control method executed by the control apparatus according to 39 or 40, in which the plurality of energy storage apparatuses include a first energy storage apparatus to which the shared power is transmitted and a second energy storage apparatus to which the demand and supply adjustment information and sharing information for determining shared power to be shared by the energy storage apparatus are transmitted, the control method further including:

transmitting the shared power to the first energy storage apparatus and transmits the demand and supply adjustment information and the sharing information to the second energy storage apparatus.

42. The control method executed by the control apparatus according to 41, further including:

selecting the at least one energy storage apparatus as a transmission destination using a storage apparatus which stores storage apparatus identification information for identifying the plurality of energy storage apparatuses in association with type identification information for identifying whether an energy storage apparatus corresponding to the storage apparatus identification information is the first energy storage apparatus or the second energy storage apparatus.

43. The control method executed by the control apparatus according to 41, further including:

storing storage apparatus identification information for identifying the plurality of energy storage apparatuses in association with type identification information for identifying whether an energy storage apparatus corresponding to the storage apparatus identification information is the first energy storage apparatus or the second energy storage apparatus in a storage apparatus, and performing the transmission by distinguishing between the first energy storage apparatus and the second energy storage apparatus using information stored in the storage apparatus.

44. The control method executed by the control apparatus according to 41, further including:

performing the transmission by distinguishing between the first energy storage apparatus to which the shared power is transmitted and the second energy storage apparatus to which the sharing information and the demand and supply adjustment information are transmitted on the basis of a communication quality with each energy storage apparatus.

45. The control method executed by the control apparatus according to 41 or 44, in which the energy storage apparatus which communicates through a dedicated channel is set as the first energy storage apparatus.

46. The control method executed by the control apparatus according to 41, further including:

performing the transmission by distinguishing between the first energy storage apparatus to which the shared power is transmitted and the second energy storage apparatus to which the sharing information and the demand and supply adjustment information are transmitted on the basis of magnitude of a rated capacity of each energy storage apparatus.

47. The control method executed by the control apparatus according to 41, in which a container type large-sized secondary battery is set as the first energy storage apparatus.

48. The control method executed by the control apparatus according to 41, further including:

performing the transmission by distinguishing between the first energy storage apparatus to which the shared power is transmitted and the second energy storage apparatus to which the sharing information and the demand and supply adjustment information are transmitted on the basis of a level of performance of a demand and supply adjustment control apparatus in each energy storage apparatus.

49. The control method executed by the control apparatus according to 48, further including:

performing the transmission by distinguishing between the first energy storage apparatus to which the shared power is transmitted and the second energy storage apparatus to which the sharing information and the demand and supply adjustment information are transmitted on the basis of a protocol and the number of services supportable by the demand and supply adjustment control apparatus.

50. The control method executed by the control apparatus according to any one of 41 to 49, further including:

transmitting the sharing ratio as the sharing information to the second energy storage apparatus.

51. The control method executed by the control apparatus according to any one of 41 to 49, further including:

calculating, for each energy storage apparatus, a sharing coefficient indicated by a ratio of maximum adjusted total power which is a total of power of which the demand and supply is adjustable by the plurality of energy storage apparatuses to chargeable and dischargeable power of the energy storage apparatus to set the sharing coefficient as the sharing information; and transmitting demand and supply adjustment information for determining a ratio of the adjusted total power to the maximum adjusted total power and the sharing information to the second energy storage apparatus, in which the shared power of each energy storage apparatus is obtained from the ratio of the adjusted total power to the maximum adjusted total power, the sharing coefficient of each energy storage apparatus, and the chargeable and dischargeable power of the energy storage apparatus.

52. The control method executed by the control apparatus according to 51, further including:

transmitting the maximum adjusted total power as the demand and supply adjustment information to the energy storage apparatus.

53. The control method executed by the control apparatus according to any one of 39 to 52, further including:

receiving the state information of the energy storage apparatus used for calculating the sharing ratio at an interval longer than an interval at which the shared power or the demand and supply adjustment information is transmitted.

54. The control method executed by the control apparatus according to 53, further including:

updating the sharing information for each energy storage apparatus on the basis of the state information at the interval longer than the interval at which the shared power or the demand and supply adjustment information is transmitted.

55. The control method executed by the control apparatus according to any one of 41 to 54, further including:

transferring, when the demand and supply adjustment information is received, the received demand and supply adjustment information as it is or after standardizing the received demand and supply adjustment information on the basis of the maximum adjusted total power and the adjusted total power to the second energy storage apparatus.

56. The control method executed by the control apparatus according to any one of 41 to 55, further including:

increasing allocation of the shared power to the first energy storage apparatus as compared with allocation of the shared power to the second energy storage apparatus.

57. The control method executed by the control apparatus according to any one of 41 to 56, further including:

transmitting the sharing information to the second energy storage apparatus at an interval shorter than the demand and supply adjustment information.

58. A program causing a computer to execute:

a procedure of calculating a sharing ratio of each of a plurality of energy storage apparatuses to adjusted total power of which demand and supply is adjusted by the energy storage apparatuses on the basis of state information of the energy storage apparatus;

a procedure of calculating shared power in at least one energy storage apparatus using demand and supply adjustment information relating to the adjusted total power in the plurality of energy storage apparatuses and the sharing ratio of the at least one energy storage apparatus; and a procedure of transmitting the shared power to the corresponding energy storage apparatus.

59. The program according to 58, in which update frequency of the sharing ratio is lower than update frequency of the demand and supply adjustment information, the program causing the computer to further execute a procedure of calculating the shared power for each energy storage apparatus on the basis of the same sharing ratio until the sharing ratio is updated and the demand and supply adjustment information.

60. The program according to 58 or 59, in which the plurality of energy storage apparatuses include a first energy storage apparatus to which the shared power is transmitted and a second energy storage apparatus to which the demand and supply adjustment information and sharing information for determining shared power to be shared by the energy storage apparatus are transmitted;

the program causing the computer to further execute a procedure of transmitting the shared power to the first energy storage apparatus and transmits the demand and supply adjustment information and the sharing information to the second energy storage apparatus.

61. The program according to 60, causing the computer to further execute a procedure of selecting the at least one energy storage apparatus as a transmission destination using a storage apparatus which stores storage apparatus identification information for identifying the plurality of energy storage apparatuses in association with type identification information for identifying whether an energy storage apparatus corresponding to the storage apparatus identification information is the first energy storage apparatus or the second energy storage apparatus.

62. The program according to 60, causing the computer to further execute:

a procedure of storing storage apparatus identification information for identifying the plurality of energy storage apparatuses in association with type identification information for identifying whether an energy storage apparatus corresponding to the storage apparatus identification information is the first energy storage apparatus or the second energy storage apparatus in a storage apparatus; and a procedure of performing the transmission by distinguishing between the first energy storage apparatus and the second energy storage apparatus using information stored in the storage apparatus.

63. The program according to 60, causing the computer to further execute a procedure of performing the transmission by distinguishing between the first energy storage apparatus to which the shared power is transmitted and the second energy storage apparatus to which the sharing information and the demand and supply adjustment information are transmitted on the basis of a communication quality with each corresponding energy storage apparatus.

64. The program according to 60 or 63, causing the computer to further execute a procedure of determining the energy storage apparatus which communicates through a dedicated channel as the first energy storage apparatus.

65. The program according to 60, causing the computer to further execute a procedure of performing the transmission by distinguishing between the first energy storage apparatus to which the shared power is transmitted and the second energy storage apparatus to which the sharing information and the demand and supply adjustment information are transmitted on the basis of magnitude of a rated capacity of each corresponding energy storage apparatus.

66. The program according to 60, causing the computer to further execute a procedure of determining a container type large-sized secondary battery as the first energy storage apparatus.

67. The program according to 60, causing the computer to further execute a procedure of performing the transmission by distinguishing between the first energy storage apparatus to which the shared power is transmitted and the second energy storage apparatus to which the sharing information and the demand and supply adjustment information are transmitted on the basis of a level of performance of a demand and supply adjustment control apparatus in each corresponding energy storage apparatus.

68. The program according to 67, causing the computer to further execute a procedure of performing the transmission by distinguishing between the first energy storage apparatus to which the shared power is transmitted and the second energy storage apparatus to which the sharing information and the demand and supply adjustment information are transmitted on the basis of a protocol and the number of services supportable by the demand and supply adjustment control apparatus.

69. The program according to any one of 60 to 68, causing the computer to further execute a procedure of transmitting the sharing ratio as the sharing information to the second energy storage apparatus.

70. The program according to any one of 60 to 68, causing the computer to further execute:
a procedure of calculating, for each energy storage apparatus, a sharing coefficient indicated by a ratio of maximum adjusted total power which is a total of power of which the demand and supply is adjustable by the plurality of energy storage apparatuses to chargeable and dischargeable power of the energy storage apparatus to set the sharing coefficient as the sharing information; and
a procedure of transmitting demand and supply adjustment information for determining a ratio of the adjusted total power to the maximum adjusted total power and the sharing information to the second energy storage apparatus,
in which the shared power of each energy storage apparatus is obtained from the ratio of the adjusted total power to the maximum adjusted total power, the sharing coefficient of each energy storage apparatus, and the chargeable and dischargeable power of the energy storage apparatus.

71. The program according to 70, causing the computer to further execute a procedure of transmitting the maximum adjusted total power as the demand and supply adjustment information to the energy storage apparatus.

72. The program according to any one of 58 to 71, causing the computer to further execute a procedure of receiving the state information of the energy storage apparatus used for calculating the sharing ratio at an interval longer than an interval at which the shared power or the demand and supply adjustment information is transmitted.

73. The program according to 72, causing the computer to further execute a procedure of updating the sharing information for each energy storage apparatus on the basis of the state information at the interval longer than the interval at which the shared power or the demand and supply adjustment information is transmitted.

74. The program according to any one of 60 to 73, causing the computer to further execute a procedure of transferring, when the demand and supply adjustment information is received, the received demand and supply adjustment information as it is or after standardizing the received demand and supply adjustment information on the basis of the maximum adjusted total power and the adjusted total power, to the second energy storage apparatus.

75. The program according to any one of 60 to 74, causing the computer to further execute a procedure of increasing allocation of the shared power to the first energy storage apparatus as compared with allocation of the shared power to the second energy storage apparatus.

76. The program according to any one of 60 to 75, causing the computer to further execute a procedure of transmitting the sharing information to the second energy storage apparatus at an interval shorter than the demand and supply adjustment information.

This application claims priority based on Japanese Patent Application No. 2016-094851 filed on May 10, 2016, the disclosure of which is incorporated herein in its entirety.

The invention claimed is:

1. A control apparatus comprising:
a memory storing instructions; and
a processor that executes the instructions to perform operations, the operations comprising:
individually calculating a sharing ratio of each of a plurality of energy storage apparatuses to adjusted total power of which demand and supply is adjusted by the plurality of energy storage apparatuses on a basis of state information of a corresponding energy storage apparatus;
calculating shared power in at least one energy storage apparatus using demand and supply adjustment information relating to the adjusted total power in the plurality of energy storage apparatuses and the sharing ratio of the at least one energy storage apparatus; and
transmitting the shared power to the corresponding energy storage apparatus;
wherein the plurality of energy storage apparatuses include a first energy storage apparatus to which the shared power is transmitted and a second energy storage apparatus to which the demand and supply adjustment information and sharing ratio for determining shared power to be shared by the corresponding energy storage apparatus are transmitted, and
wherein transmitting the shared power to the corresponding energy storage apparatus comprises: transmitting the shared power to the first energy storage apparatus and transmitting the demand and supply adjustment information and the sharing ratio to the second energy storage apparatus.

2. The control apparatus according to claim 1,
wherein update frequency of the sharing ratio is lower than update frequency of the demand and supply adjustment information, and
wherein calculating the shared power comprises calculating the shared power for each energy storage apparatus using the same sharing ratio and the demand and supply adjustment information until the sharing ratio is updated.

3. The control apparatus according to claim 1, the operations further comprising:
selecting the at least one energy storage apparatus as a transmission destination using storage apparatus identification information for identifying the plurality of energy storage apparatuses in association with type identification information for identifying whether an energy storage apparatus corresponding to the storage apparatus identification information is the first energy storage apparatus or the second energy storage apparatus.

4. The control apparatus according to claim 1, the operations further comprising:
storing information including storage apparatus identification information for identifying the plurality of energy storage apparatuses in association with type identification information for identifying whether an energy storage apparatus corresponding to the storage apparatus identification information is the first energy storage apparatus or the second energy storage apparatus,
wherein transmitting the shared power comprises distinguishing between the first energy storage apparatus and the second energy storage apparatus using the stored information.

5. The control apparatus according to claim 1,
wherein transmitting the shared power comprises distinguishing between the first energy storage apparatus to which the shared power is transmitted and the second energy storage apparatus to which the sharing ratio and the demand and supply adjustment information are transmitted on the basis of a communication quality with each corresponding energy storage apparatus.

6. The control apparatus according to claim 1, the operations further comprising:
determining the energy storage apparatus which communicates through a dedicated channel as the first energy storage apparatus.

7. The control apparatus according to claim 1,
wherein transmitting the shared power comprises distinguishing between the first energy storage apparatus to which the shared power is transmitted and the second energy storage apparatus to which the sharing ratio and the demand and supply adjustment information are transmitted on the basis of magnitude of a rated capacity of each corresponding energy storage apparatus.

8. The control apparatus according to claim 1, the operations further comprising:
determining a container type large-sized secondary battery as the first energy storage apparatus.

9. The control apparatus according to claim 1,
wherein transmitting the shared power comprises distinguishing between the first energy storage apparatus to which the shared power is transmitted and the second energy storage apparatus to which the sharing ratio and the demand and supply adjustment information are transmitted on the basis of a level of performance of a demand and supply adjustment control apparatus in each corresponding energy storage apparatus.

10. The control apparatus according to claim 9,
wherein transmitting the shared power comprises distinguishing between the first energy storage apparatus to which the shared power is transmitted and the second energy storage apparatus to which the sharing ratio and the demand and supply adjustment information are transmitted on the basis of a protocol and the number of services supportable by the demand and supply adjustment control apparatus.

11. The control apparatus according to claim 1, wherein transmitting the shared power comprises transmitting the sharing ratio as the sharing ratio information to the second energy storage apparatus.

12. The control apparatus according to claim 1,
wherein calculating the sharing ratio comprises calculating, for each energy storage apparatus, a sharing coefficient indicated by a ratio of maximum adjusted total power which is a total of power of which the demand and supply is adjustable by the plurality of energy storage apparatuses to chargeable and dischargeable power of the corresponding energy storage apparatus to set the sharing coefficient as the sharing ratio,
wherein transmitting the shared power comprises demand and supply adjustment information for determining a ratio of the adjusted total power to the maximum adjusted total power and the sharing ratio to the second energy storage apparatus, and
wherein the shared power of each energy storage apparatus is obtained from the ratio of the adjusted total power to the maximum adjusted total power, the sharing coefficient of each energy storage apparatus, and the chargeable and dischargeable power of the energy storage apparatus.

13. The control apparatus according to claim 12,
wherein transmitting the shared power comprises transmitting the maximum adjusted total power as the demand and supply adjustment information to the energy storage apparatus.

14. The control apparatus according to claim 1, the operations further comprising:
receiving the state information of the energy storage apparatus used for calculating the sharing ratio at an interval longer than an interval at which the shared power or the demand and supply adjustment information is transmitted.

15. The control apparatus according to claim 14,
wherein calculating the shared power comprises updating the sharing ratio for each energy storage apparatus on the basis of the state information at the interval longer than the interval at which the shared power or the demand and supply adjustment information is transmitted.

16. The control apparatus according to claim 1,
wherein when the demand and supply adjustment information is received, transferring the received demand and supply adjustment information as it is or after standardizing the received demand and supply adjustment information on the basis of the maximum adjusted total power and the adjusted total power, to the second energy storage apparatus.

17. The control apparatus according to claim 1, the operations further comprising:
increasing allocation of the shared power to the first energy storage apparatus as compared with allocation of the shared power to the second energy storage apparatus.

18. The control apparatus according to claim 1,
wherein transmitting the shared power comprises transmitting the sharing ratio to the second energy storage apparatus at an interval longer than the demand and supply adjustment information.

19. A demand and supply adjustment system comprising:
a demand and supply adjustment control apparatus which controls an energy storage apparatus; and
    a control apparatus connected to the demand and supply adjustment control apparatus through a network,
wherein the control apparatus comprises:
a memory storing instructions; and
a processor that executes the instructions to perform operations, the operations comprising:
individually calculating calculates a sharing ratio of each of a plurality of energy storage apparatuses to adjusted total power of which demand and supply is adjusted by the plurality energy storage apparatuses on a basis of state information of the corresponding energy storage apparatus,
calculating shared power in at least one energy storage apparatus using demand and supply adjustment information relating to the adjusted total power in the plurality of energy storage apparatuses and the sharing ratio of the at least one energy storage apparatus, and
transmitting the shared power to the corresponding energy storage apparatus;
wherein the plurality of energy storage apparatuses include a first energy storage apparatus to which the shared power is transmitted and a second energy storage apparatus to which the demand and supply adjustment information and sharing ratio for determining shared power to be shared by the corresponding energy storage apparatus are transmitted, and
wherein transmitting the shared power comprises transmitting the shared power to the first energy storage apparatus and transmits the demand and supply adjustment information and the sharing ratio to the second energy storage apparatus.

20. A control method performed by a control apparatus, the control method comprising:
individually calculating a sharing ratio of each of a plurality of energy storage apparatuses to adjusted total power of which demand and supply is adjusted by the plurality energy storage apparatuses on a basis of state information of a corresponding energy storage apparatus by a control apparatus;
calculating shared power in at least one energy storage apparatus using demand and supply adjustment information relating to the adjusted total power in the plurality of energy storage apparatuses and the sharing ratio of the at least one energy storage apparatus; and
transmitting the shared power to the corresponding energy storage apparatus~wherein the plurality of energy storage apparatuses include a first energy storage apparatus to which the shared power is transmitted and a second energy storage apparatus to which the demand and supply adjustment information and sharing ratio for determining shared power to be shared by the corresponding energy storage apparatus are transmitted, and
wherein transmitting the shared power comprises transmitting the shared power to the first energy storage apparatus and transmitting the demand and supply adjustment information and the sharing ratio to the second energy storage apparatus.

21. A non-transitory computer readable storage medium storing a program causing a computer to execute:
a procedure of individually calculating a sharing ratio of each of a plurality of energy storage apparatuses to adjusted total power of which demand and supply is adjusted by the plurality energy storage apparatuses on a basis of state information of a corresponding energy storage apparatus;
a procedure of calculating shared power in at least one energy storage apparatus using demand and supply adjustment information relating to the adjusted total power in the plurality of energy storage apparatuses and the sharing ratio of the at least one energy storage apparatus; and
a procedure of transmitting the shared power to the corresponding energy storage apparatus;
wherein the plurality of energy storage apparatuses include a first energy storage apparatus to which the shared power is transmitted and a second energy storage apparatus to which the demand and supply adjustment information and sharing ratio for determining shared power to be shared by the corresponding energy storage apparatus are transmitted, and
wherein the procedure of transmitting the shared power comprises transmitting the shared power to the first energy storage apparatus and transmitting the demand and supply adjustment information and the sharing ratio to the second energy storage apparatus.

* * * * *